(12) United States Patent
Nakazawa

(10) Patent No.: US 6,192,201 B1
(45) Date of Patent: Feb. 20, 2001

(54) FILM CARTRIDGE WITH IC MEMORY AND APPARATUS THAT USES IT AND METHOD OF USING IT

(75) Inventor: Makoto Nakazawa, Asaka (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/080,460

(22) Filed: May 19, 1998

(30) Foreign Application Priority Data

May 19, 1997 (JP) .................................................. 9-128897
Jan. 5, 1998 (JP) ................................................... 10-000460

(51) Int. Cl.$^7$ ............................. G03B 17/24; G03B 17/26
(52) U.S. Cl. ......................... 396/321; 396/208; 396/513; 396/538
(58) Field of Search ..................... 396/207, 208, 396/321, 512, 513, 516, 538; 358/506, 487

(56) References Cited

U.S. PATENT DOCUMENTS

| | | | |
|---|---|---|---|
| 4,714,332 | * 12/1987 | Eguchi et al. | 396/208 |
| 5,032,855 | * 7/1991 | Taniguchi et al. | 396/321 |
| 5,130,745 | 7/1992 | Cloutier et al. | |
| 5,455,648 | * 10/1995 | Kazami | 396/311 |
| 5,548,360 | * 8/1996 | Uematsu et al. | 396/208 |
| 5,701,530 | * 12/1997 | Fugino | 396/321 |
| 5,710,617 | * 1/1998 | Inuiya | 355/40 |
| 5,819,126 | * 10/1998 | Kitagawa et al. | 396/512 |
| 5,966,554 | * 10/1999 | Haraguchi | 396/513 |

FOREIGN PATENT DOCUMENTS 7-287323   10/1995   (JP) .

* cited by examiner

Primary Examiner—Alan A. Mathews

(57) ABSTRACT

An apparatus using a film cartridge having an IC memory unit. The IC memory unit is arranged beneath a side of a cartridge shell of the film cartridge, and a positioning hole is formed on the side of the cartridge shell. In order to read/write information from/to the IC memory unit, an arm of a contact unit is rotated towards the cartridge shell, so that a positioning pin provided at the arm end engages the positioning hole to position the cartridge shell, and contact pins provided at the arm end are brought into contact with terminals of the IC memory unit.

26 Claims, 15 Drawing Sheets

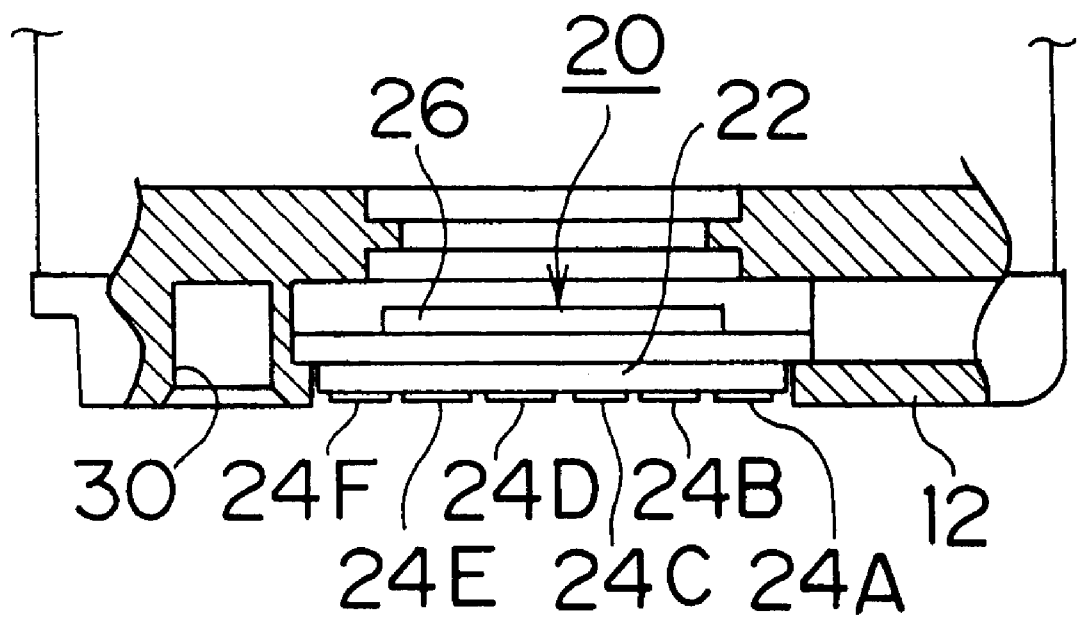
F I G. 2

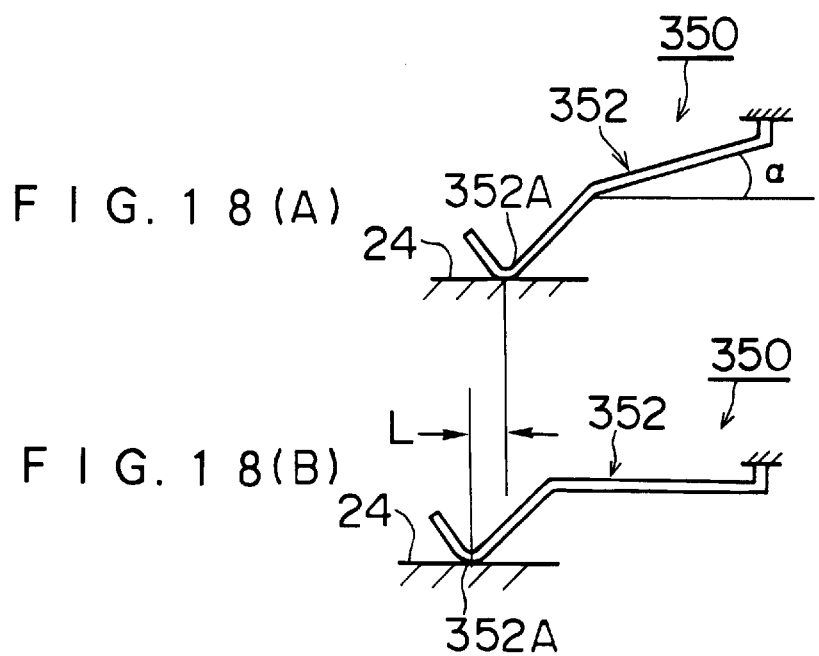
FIG. 18(A)
FIG. 18(B)
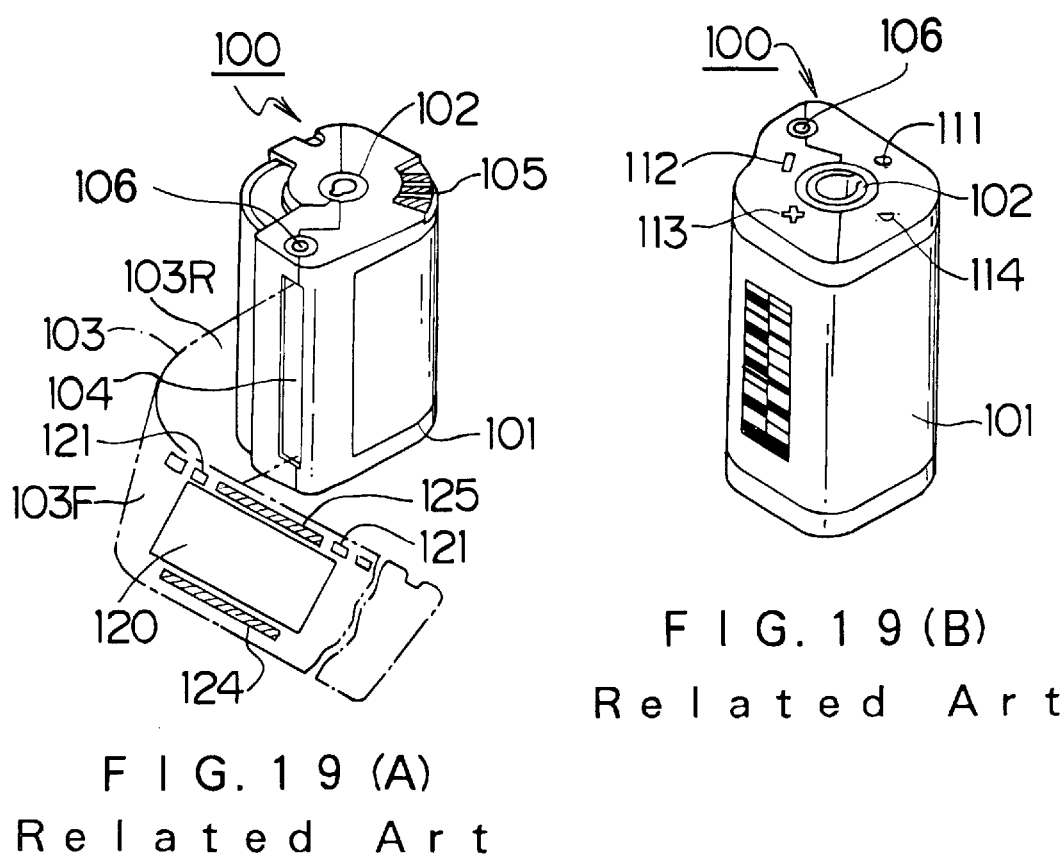
FIG. 19(A)
Related Art
FIG. 19(B)
Related Art

FILM CARTRIDGE WITH IC MEMORY AND APPARATUS THAT USES IT AND METHOD OF USING IT

BACKGROUND OF THE INVENTION

1. Field of the Invention

The present invention relates generally to a film cartridge with an IC memory, an apparatus that uses it, and a method of using it, and more particularly to a film cartridge with an IC memory, an apparatus that uses the film cartridge with the IC memory such as a camera, a photofinishing apparatus and a film image reproducing apparatus, and a method of using the film cartridge with the IC memory including a procedure for reading information from the IC memory.

2. Description of Related Art

There has been proposed an advanced photographic film in which a magnetic layer is formed on one side of a silver halide film (U.S. Pat. No. 5,130,745). A film cartridge for containing the film and a camera that uses the film cartridge have also been developed, and they have become standardized worldwide.

As shown in FIGS. 19(A) and 19(B), in the above-mentioned new standard film cartridge 100, a continuous photographic film 103 is wound on a spool 102 and is contained in a substantially cylindrical cartridge shell 101, which has a light-shielding structure. A light-shielding door 104 is provided at one end of the cartridge shell 101. The film 103 is entirely contained in the cartridge shell 101 and the light-shielding door 104 protects the film 103 from external light, if the film cartridge 100 containing the unexposed film has not been loaded in the camera yet or when the film cartridge 100 containing the exposed film is out of the camera. The light-shielding door 104 is opened and closed by inserting a door driver (not shown) into a door driving hole 106 and rotating the door driver.

A data disk 105 is provided at one side (a reference side) of the cartridge shell 101, and the data disk 105 rotates in association with the spool 102. A bar code indicating film information such as type, sensitivity and a number of frames to be exposed of the film 103 is printed on the outer surface of the data disk 105. Circular, square, X and semicircular holes 111, 112, 113 and 114 are punched at the other side of the cartridge shell 101. A white sectorial piece (not shown) is provided at the back of the holes and is fixed to the spool 102, and one of the circular, square, X and semicircular marks is shown in white in accordance with a position of the sectorial piece.

In the film 103, a silver halide photosensitive layer is formed on a surface 103F of a film base, and a magnetic recording layer is formed on the reverse surface 103R of the film base. A plurality of perforations 121 are punched at the edge of the film 103, and they specify each frame 120. Exposure information such as the type of a light source and a focal length on the exposure, and a user's message such as a title of a photograph can be magnetically recorded in magnetic record areas 124, 125 at the top end and bottom end of each frame.

When the film cartridge 100 is loaded in the camera, the camera reads the bar code information on the data disk 105 with an optical reading mechanism, and detects the position of the sectorial piece, thereby automatically recognizing the film information and the used status of the film. If the camera recognizes that the film cartridge 100 contains a film in which at least one unexposed frame remains, the light-shielding door 104 is opened and the spool 102 is rotated in a predetermined direction, so that the film 103 can be automatically fed to the first unexposed frame.

After all the frames on the film 103 are exposed, a rewinding mechanism of the camera rewinds film 103 into the cartridge shell 101, and the light-shielding door 104 is closed. Then, the sectorial piece that is fixed to the spool 102 is stopped at the X hole, so that the X hole is shown in white to indicate that the film cartridge 100 contains the film 103 on which all the frames have already been exposed.

There has been proposed a film image reproducing apparatus using the film cartridge 100 containing the film 103 that is developed. The film image reproducing apparatus automatically transports the film 103 from the film cartridge 100, and reads the frame image using an image pickup unit. The film image reproducing apparatus is then able to output image signals representing the read frame image to a TV monitor and/or a personal computer.

In the apparatus such as the camera and the film image reproducing apparatus that use the film cartridge 100, there is provided in a cartridge loading chamber a spool drive shaft and a door driver, which are inserted into the spool 102 and the door driving hole 106, respectively, of the film cartridge 100. Guide shafts that are inserted into the spool 102 and the door driving hole 106, respectively, are provided on the inside face of a chamber door on the cartridge loading chamber. When the film 103 is transported, the spool 102 and the door driving hole 106 are pivotally supported by the spool drive shaft, the door driver and the guide shafts in such a manner as to prevent the cartridge shell 101 from being in contact with the inner wall of the cartridge loading chamber. Thereby, the cartridge shell 101 is able to float (this will hereinafter be referred to as a shell floating state).

Since the spool 102 is rotatably arranged with play in the cartridge shell 101, the cartridge shell 101 has freedom in the shell floating state. This prevents the film 103 from being damaged by the cartridge shell 101 while the film 103 is transported.

The applicant of the present invention has proposed a film cartridge provided with an IC memory unit (Japanese Patent Provisional Publication No. 7-287323). Since terminals of the IC memory unit are provided on a cartridge shell of the film cartridge, positions of the terminals cannot be fixed during the shell-floating. Thus, a contact area of each terminal on the cartridge shell must be large enough so that the terminal comes into contact with each of the contacts on the cartridge loading chamber without fail in view of the movement amount of the cartridge shell while the shell is floating. In this case, it is impossible to provide a plurality of terminals on the limited surface area of the cartridge shell.

The terminals on the cartridge shell are arranged on a side that is perpendicular to a direction in which the cartridge is loaded in the cartridge loading chamber. For this reason, the loading of the film cartridge into the cartridge loading chamber does not cause the contacts on the cartridge loading chamber to rub the terminals on the cartridge shell. Hence, a reliable electrical connection between the contacts. On the cartridge loading chamber and the terminals on the cartridge shell may become impossible due to corrosion on the terminals, the adhesion of dust, or the like.

SUMMARY OF THE INVENTION

It is an object of the present invention to provide the film cartridge with the IC memory having the cartridge shell that is able to be positioned.

It is another object of the present invention to provide the apparatus using the film cartridge with the IC memory that allows the cartridge shell to float when the film is transported, and that positions the cartridge shell when the information is read from or written to the IC memory.

It is yet another object of the present invention to provide the apparatus using the film cartridge with an IC memory that is able to carry the current through the contact parts without fail when the information is read from or written to the IC memory.

It is yet another object of the present invention to provide the method of using the film cartridge with the IC memory, in which the information is read from and written to the IC memory without disturbing the transportation of the film.

To achieve the above-mentioned objects, the present invention is directed to a film cartridge that comprises: a continuous photographic film; a cartridge shell containing the film, an inside of the cartridge shell being substantially cylindrical, the cartridge shell having an opening through which the film goes out, a light-shielding door arranged on the opening, a light-shielding door opening and closing hole for opening and closing the light-shielding door, and an IC memory unit, a plurality of terminals of the IC memory unit being exposed on a surface of the cartridge shell, one of a positioning hole and a positioning notch for positioning the cartridge shell being provided on a side of the cartridge shell; and a spool rotatably arranged in the cartridge shell with a predetermined play, one end of the film in longitudinal direction thereof being fixed to the spool, the film being wound on the spool.

The diameter of the positioning hole, which is provided on the cartridge shell, is 2 mm or more in view of the movement amount of the cartridge shell. The IC memory unit is arranged beneath the reference side of the cartridge shell, and the positioning hole or notch is formed on the reference side.

The IC memory unit contains index image information representing a plurality of frame images on the developed photographic film in the film cartridge. It is possible to confirm the contents of the photographic film without pulling out the photographic film from the film cartridge.

The present invention is directed to an apparatus using the film cartridge with the IC memory, the apparatus comprising: a cartridge loading chamber for containing the film cartridge, the cartridge loading chamber having, at the rear end thereof, a spool drive shaft and a door driver respectively engaging the spool and the light-shielding door opening and closing hole on the film cartridge; a chamber door for opening and closing the cartridge loading chamber, the chamber door being provided with guide shafts, the guide shafts respectively engaging the spool and the light-shielding door opening and closing hole of the film cartridge when the chamber door is closed; a positioning mechanism including a positioning member engaging the one of the positioning hole and the positioning notch on the cartridge shell, the positioning mechanism positioning the cartridge shell at a predetermined position in the cartridge loading chamber by engaging the positioning member to the one of the positioning hole and the positioning notch; a contact mechanism including a plurality of contact members coming into contact with the plurality of terminals of the IC memory unit, the contact mechanism bringing the plurality of contact members into contact with the plurality of terminals only when the positioning mechanism positions the cartridge shell; a means for reading information from the IC memory unit and writing information in the IC memory unit via the plurality of contact members in the contact mechanism; and wherein the spool drive shaft, the door driver and the guide shafts pivotally support the spool and the light-shielding door opening and closing hole of the film cartridge, the cartridge shell is able to float at least while the film is being transported, the positioning mechanism positions the cartridge shell at the predetermined position in the cartridge loading chamber when the information is read from and written in the IC memory unit.

The positioning mechanism and the contact mechanism comprise an arm in which the positioning member and the plurality of contact members are arranged at the end thereof, and an arm driving mechanism that rotates the arm so as to position the cartridge shell and bring the contact members into contact with the terminals of the IC memory unit.

The present invention is directed to an apparatus using a film cartridge comprising: a continuous photographic film; a cartridge shell containing the film, an inside of the cartridge shell being substantially cylindrical, the cartridge shell having an opening through which the film goes out, a light-shielding door arranged on the opening, a light-shielding door opening and closing hole for opening and closing the light-shielding door, and an IC memory unit, a plurality of terminals of the IC memory unit being exposed on a surface of the cartridge shell; and a spool rotatably arranged in the cartridge shell with a predetermined play, one end of the film in longitudinal direction thereof being fixed to the spool, the film being wound on the spool; the apparatus comprising: a cartridge loading chamber for containing the film cartridge, the cartridge loading chamber having, at the rear end thereof, a spool drive shaft and a door driver respectively engaging the spool and the light-shielding door opening and closing hole on the film cartridge; a chamber door for opening and closing the cartridge loading chamber, the chamber door being provided with guide shafts respectively engaging the spool and the light-shielding door opening and closing hole of the film cartridge; a positioning mechanism including a positioning member coming into contact with at least two positions on the outer periphery of the cartridge shell, the positioning mechanism positioning the cartridge shell at a predetermined position in the cartridge loading chamber by bring the positioning member into contact with the outer periphery of the cartridge shell; a contact mechanism including a plurality of contact members coming into contact with the plurality of terminals of the IC memory unit, the contact mechanism bringing the plurality of contact members into contact with the plurality of terminals only when the positioning mechanism positions the cartridge shell; a means for reading information from the IC memory unit and writing information in the IC memory unit via the plurality of contact members in the contact mechanism; and wherein the spool drive shaft, the door driver and the guide shafts pivotally support the spool and the light-shielding door opening and closing hole of the film cartridge, the cartridge shell is able to float at least while the film is being transported, the positioning mechanism positions the cartridge shell at the predetermined position in the cartridge loading chamber when the information is read from and written in the IC memory unit. According to this apparatus, the positioning hole or the positioning notch on the cartridge shell is not required.

In the apparatus using the film cartridge with the IC memory, the positioning mechanism and the contact mechanism retreat the positioning member and the contact members in association with one of the light-shielding door opening action of a light-shielding door driving mechanism rotating the door driver and the unlocking action of a spool lock mechanism mechanically locking and unlocking the spool drive shaft, and the positioning mechanism and the contact mechanism bring the positioning member and the contact members into contact with the cartridge shell in association with one of the light-shielding door closing action of the light-shielding door driving mechanism and the locking action of the spool lock mechanism.

The present invention is directed to an apparatus using a film cartridge comprising: a continuous photographic film; a cartridge shell containing the film, an inside of the cartridge shell being substantially cylindrical, the cartridge shell having an opening through which the film goes out, a light-shielding door arranged on the opening, a light-shielding door opening and closing hole for opening and closing the light-shielding door, and an IC memory unit, a plurality of terminals of the IC memory unit being exposed on a surface of the cartridge shell; and a spool rotatably arranged in the cartridge shell with a predetermined play, one end of the film in longitudinal direction thereof being fixed to the spool, the film being wound on the spool; the apparatus comprising: a cartridge loading chamber for containing the film cartridge, the cartridge loading chamber having, at the rear end thereof, a spool drive shaft and a door driver respectively engaging the spool and the light-shielding door opening and closing hole on the film cartridge; a chamber door for opening and closing the cartridge loading chamber, the chamber door being provided with guide shafts respectively engaging the spool and the light-shielding door opening and closing hole of the film cartridge; a positioning mechanism including a positioning member coming into contact with at least two positions on the outer periphery of the cartridge shell, the positioning mechanism positioning the cartridge shell at a predetermined position in the cartridge loading chamber by bring the positioning member into contact with the outer periphery of the cartridge shell; a contact mechanism including a plurality of contact members coming into contact with the plurality of terminals of the IC memory unit, the contact mechanism bringing the plurality of contact members into contact with the plurality of terminals and retreating the plurality of contact members from the plurality of terminals; a means for reading information from the IC memory unit and writing information in the IC memory unit via the plurality of contact members in the contact mechanism; and wherein the contact mechanism moves the plurality of contact members on surfaces of the plurality of terminals to clean the surfaces of the plurality of terminals. According to this apparatus, the contact members move on the surfaces of the terminals while being pressed on the surfaces, and thereby, the surfaces of the terminals are cleaned even if the terminals corrode or are covered with dust.

In the apparatus using the film cartridge with the IC memory, the contact mechanism comprises an arm elastically holding the plurality of contact members at an end thereof, a first drive mechanism rotating the arm to bring the plurality of contact members into contact with the plurality of terminals under pressure and retreating the plurality of contact members from the plurality of terminals, and second drive mechanism moving at least the plurality of contact members substantially parallel to the surfaces of the plurality of terminals.

In the apparatus using the film cartridge with the IC memory, the contact mechanism has the contact members that are one of wire springs and leaf springs tilted at a predetermined angle with respect to the surfaces of the plurality of terminals, the contact mechanism relatively moves the plurality of contact members and the plurality of terminals relatively to one another in cartridge loading/unloading directions to bring the plurality of contact members into contact with the plurality of terminals under pressure and retreat the plurality of contact members from the plurality of terminals, and ends of the plurality of contact members slide on the surfaces of the plurality of terminals when the plurality of contact members are brought into contact with and retreated from the plurality of terminals. The plurality of terminals of the IC memory unit are arranged on a side of the cartridge shell perpendicular to a direction in which the film cartridge is loaded into the cartridge loading chamber.

The apparatus using the film cartridge with the IC memory further comprises: a positioning mechanism including a positioning member coming into contact with at least two positions on the outer periphery of the cartridge shell, the positioning mechanism positioning the cartridge shell at a predetermined position in the cartridge loading chamber by bring the positioning member into contact with the outer periphery of the cartridge shell; and wherein the spool drive shaft, the door driver and the guide shafts pivotally support the spool and the light-shielding door opening and closing hole of the film cartridge, the cartridge shell is able to float at least while the film is being transported, the positioning mechanism positions the cartridge shell at the predetermined position in the cartridge loading chamber when the information is read from and written in the IC memory unit. According to this apparatus, the terminals on the cartridge shell are fixed to the predetermined position, and thus, the contact members can be connected to the terminals without fail. In the apparatus using the film cartridge, one of a positioning hole and a positioning notch for positioning the cartridge shell is provided on a side of the cartridge shell of the film cartridge; the apparatus further comprises a positioning mechanism including a positioning member engaging the one of the positioning hole and the positioning notch on the cartridge shell, the positioning mechanism positioning the cartridge shell at a predetermined position in the cartridge loading chamber by engaging the positioning member to the one of the positioning hole and the positioning notch; and the spool drive shaft, the door driver and the guide shafts pivotally support the spool and the light-shielding door opening and closing hole of the film cartridge, the cartridge shell is able to float at least while the film is being transported, the positioning mechanism positions the cartridge shell at the predetermined position in the cartridge loading chamber when the information is read from and written in the IC memory unit.

The present invention also includes a method of using a film cartridge comprising: a continuous photographic film; a cartridge shell containing the film, an inside of the cartridge shell being substantially cylindrical, the cartridge shell having an opening through which the film goes out, a light-shielding door arranged on the opening, a light-shielding door opening and closing hole for opening and closing the light-shielding door, and an IC memory unit, a plurality of terminals of the IC memory unit being exposed on a surface of the cartridge shell; and a spool rotatably arranged in the cartridge shell with a predetermined play, one end of the film in longitudinal direction thereof being fixed to the spool, the film being wound on the spool; the method comprising the steps of: bringing contact members of a contact mechanism provided in a cartridge loading chamber into contact with the plurality of terminals of the IC memory unit, after the film cartridge is loaded in the cartridge loading chamber and a chamber door of the cartridge loading chamber is closed; reading the information from the IC memory unit via the contact members, before pulling out the film from the film cartridge; retreating the contact members from the terminals to enable the cartridge shell to float, after reading the information from the IC memory unit before pulling out the film from the film cartridge; transporting the film in the state wherein the cartridge shell is allowed to float, and processing the film as required; rewind up the film into the film cartridge after completion of the processing; bringing the contact members into contact with the terminals under pressure and writing information in the IC memory unit after completion of the rewinding; and opening the chamber door to allow the film cartridge to be unloaded from the cartridge loading chamber after writing the information.

The contact mechanism is retreated from and brought into contact with the terminals in association with the opening and closing action of the light-shielding door and the locking and unlocking action of the spool.

The method further comprises the steps of: stopping the film and bringing the contact members into contact with the terminals under pressure so as to read/write the information from/in the IC memory unit when the film is out of the film cartridge; and retreating the contact members from the terminals after the reading/writing of the information, thereby enabling the film to be transported.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a sectional view illustrating the essential parts along line 2—2 of FIG. 1;

FIGS. 18(A) and 18(B) are views illustrating the contact starting state and the state wherein the contact unit is pressed on the contacts for explaining a cleaning function of the contact unit; and FIGS. 19(A) and 19B) are perspective views illustrating a conventional film cartridge.

DETAILED DESCRIPTION OF THE PREFERRED EMBODIMENT

Figure 1:
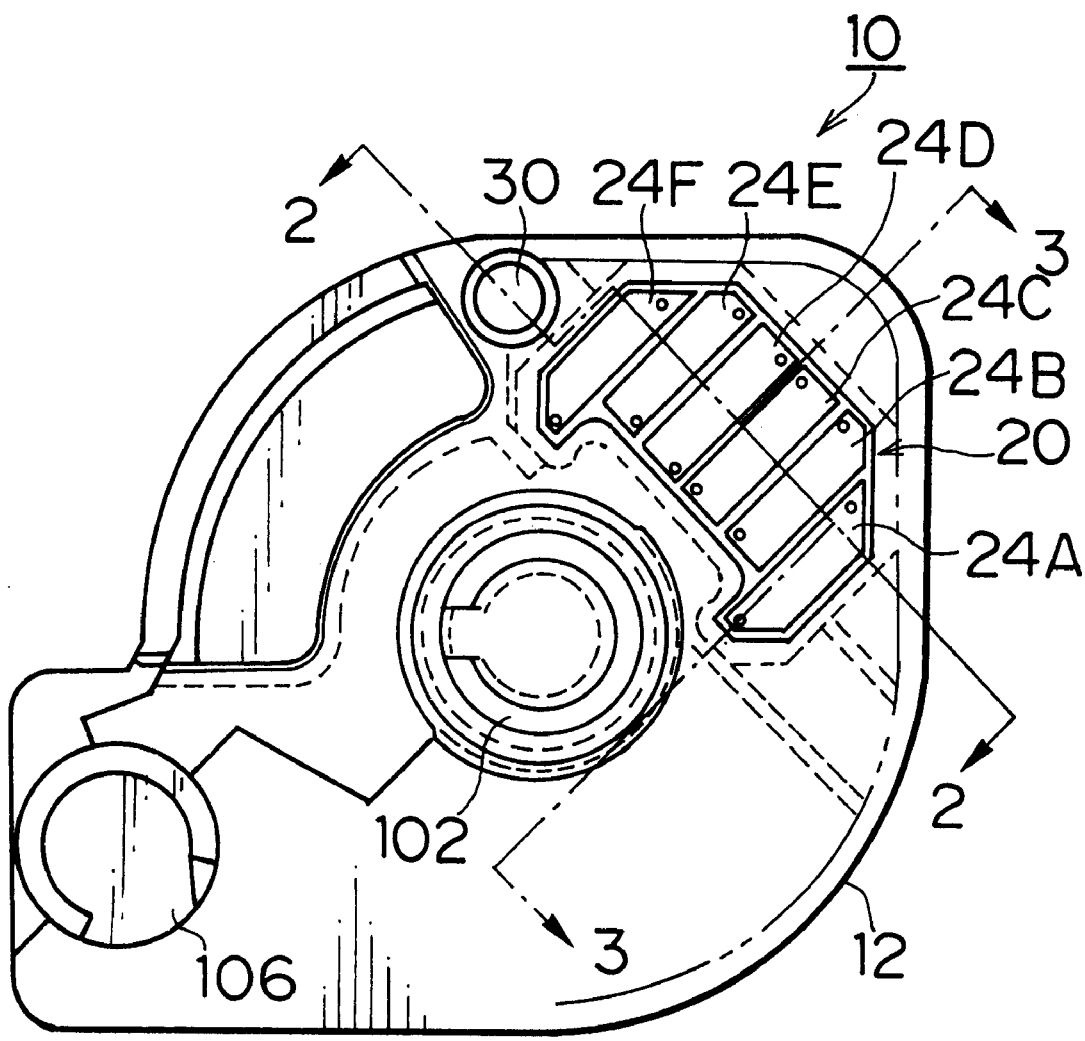
FIG. 1 is a top view illustrating an embodiment of a film cartridge with an IC memory according to the present invention.
Figure 3:
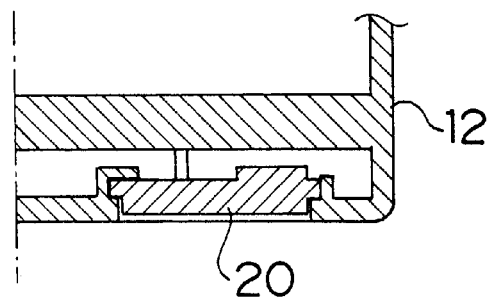
FIG. 3 is a sectional view illustrating the essential parts along line 3—3 of FIG. 1.

This invention will now be described in further detail by way of example with reference to the accompanying drawings, FIG. 1 is a top view illustrating a reference side of a film cartridge with an IC memory according to the present invention. FIG. 2 is a sectional view of the essential parts along line 2—2 of FIG. 1, and FIG. 3 is a sectional view of the essential parts along line 3—3 of FIG. 1.

The film cartridge 10 is provided with an IC memory unit 20, which is arranged in a cartridge shell 12, and a positioning hole 30 for positioning the cartridge shell 12. Other structures of the film cartridge 10 are similar to those of a conventional film cartridge in FIGS. 19(A) and 19(B).

The IC memory unit 20 consists of a substrate 22, on which six terminals 24A, 24B, 24C, 24D, 24E, 24F are formed as shown in FIGS. 1 and 2, and an IC memory (e.g. a flash memory) 26 that is electrically connected to the terminals 24A–24F. The six terminals are a power supply terminal (VCC), a ground terminal (GND), a serial data input terminal (SI), a serial data output terminal (SO), a clock terminal (CLOCK), and a chip selector terminal (CS), respectively. As shown in FIGS. 2 and 3, the substrate 22 is terraced in order to be fixed into the cartridge shell 12.

As shown in FIG. 1, the IC memory unit 20 is provided on the reference side of the cartridge shell 12, and it is located at the opposite side of a door driving hole 106 across a spool 102. This arrangement is suitable for securing a large area for the terminals 24A–24F. The above-mentioned arrangement of the IC memory unit 20 is advantageous for molding the cartridge shell 12 to contain the IC memory unit 20. Since the IC memory unit 20 is provided, the data disk 105 in FIG. 19(A) is not provided.

As shown in FIGS. 1 and 2, the positioning hole 30 for positioning the cartridge shell 12 is formed adjacent to the IC memory unit 20 on the reference side of the cartridge shell 12. The positioning hole 30 is 2 mm in diameter, and the beginning of the hole 30 is enlarged. The diameter of 2 mm is the minimum that makes it possible to position the cartridge shell 12 wherever it is located during the shell-floating. For this reason, the diameter of the positioning hole 30 may be more than 2 mm.

Figure 4:
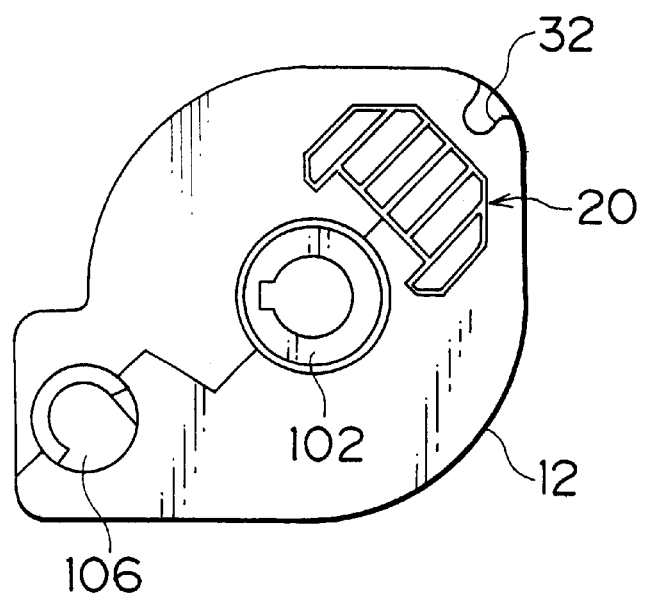
FIG. 4 is a top view illustrating another embodiment of the film cartridge with the IC memory according to the present invention.

In this embodiment, the terminals 24A–24F and the positioning hole 30 are formed on the reference side of the film cartridge 12, but they both may be formed on the opposite side of the reference side. The positioning hole 30 has to be provided on the side on which the terminals 24A–24F are formed. Although only one positioning hole 30 is provided in this embodiment, two or more positioning holes may be provided. As shown in FIG. 4, a positioning notch 32 may be formed on the cartridge shell 12 instead of the positioning hole 30.

Parts between the terminals may be raised by printing or may be projected by arranging a member for terminal separation on the substrate 22. The raised or projected parts can prevent a short circuit between the terminals through foreign matters, and can guide later-described contact pins to come into contact to predetermined positions.

Figure 5:
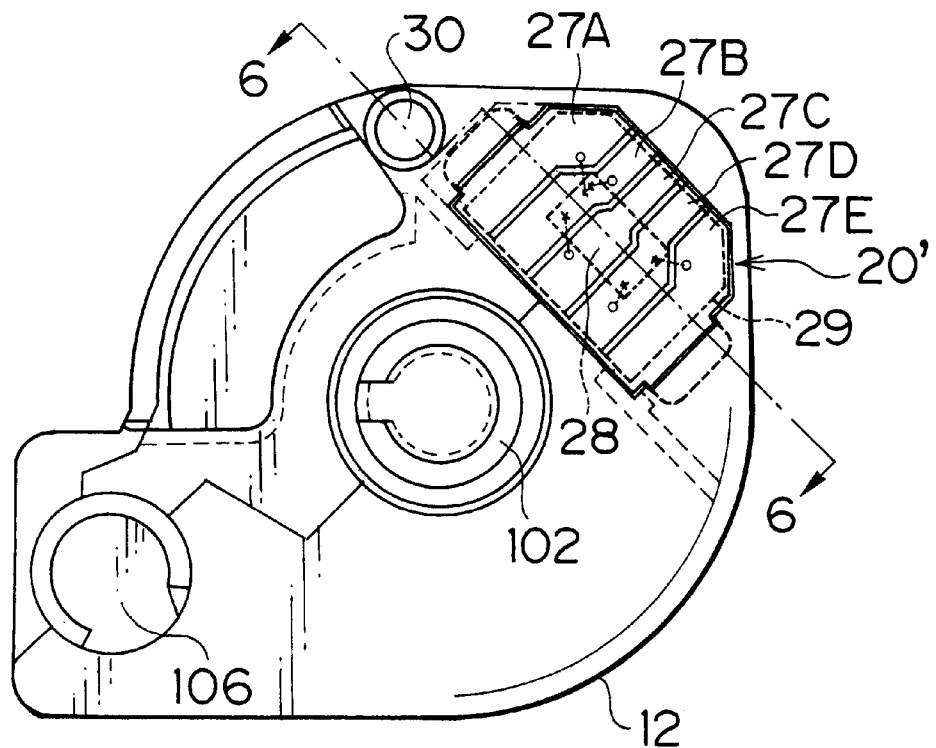
FIG. 5 is a top view illustrating another embodiment of the film cartridge with the IC memory unit according to the present invention.
Figure 6:
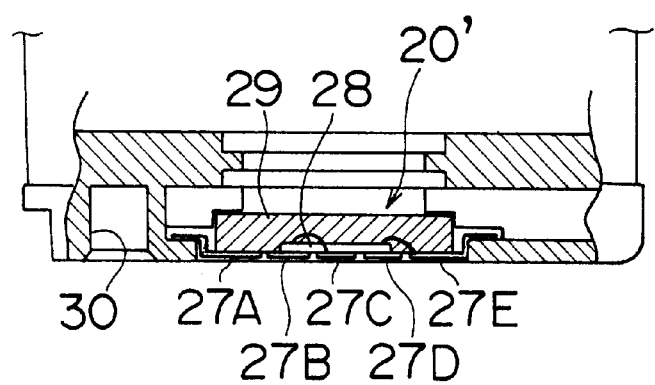
FIG. 6 is a sectional view illustrating the essential parts along line 6—6 of FIG. 5.

FIGS. 5 and 6 illustrate another embodiment of the IC memory unit. FIG. 5 is a top view illustrating the reference side of the cartridge shell 12, and FIG. 6 is a sectional view illustrating the essential parts along line 6—6 of FIG. 5.

As shown in FIGS. 5 and 6, an IC memory unit 20' utilizes five leads 27A–27E of an IC memory 28 as the terminals. The IC memory 28 is fixed on the lead members 27B–27D in the insulated state, and the IC memory 28 is wire-bonded to the leads 27A–27E. Then, the IC memory 28 is packaged in a package 29 such as resin. The leads (the terminals) 27A–27E are an SI terminal, a CLOCK terminal, a GND terminal, an SO terminal, and a VCC terminal, respectively.

In the IC memory unit 20', the package 29 may be shaped arbitrarily to provide the terminals 27A–27E thereon. Moreover, the IC memory unit 20' can be thin, and the manufacturing steps therefore can be reduced.

A description will now be given of an apparatus which uses the film cartridge with the IC memory according to the present invention.

Figure 7:
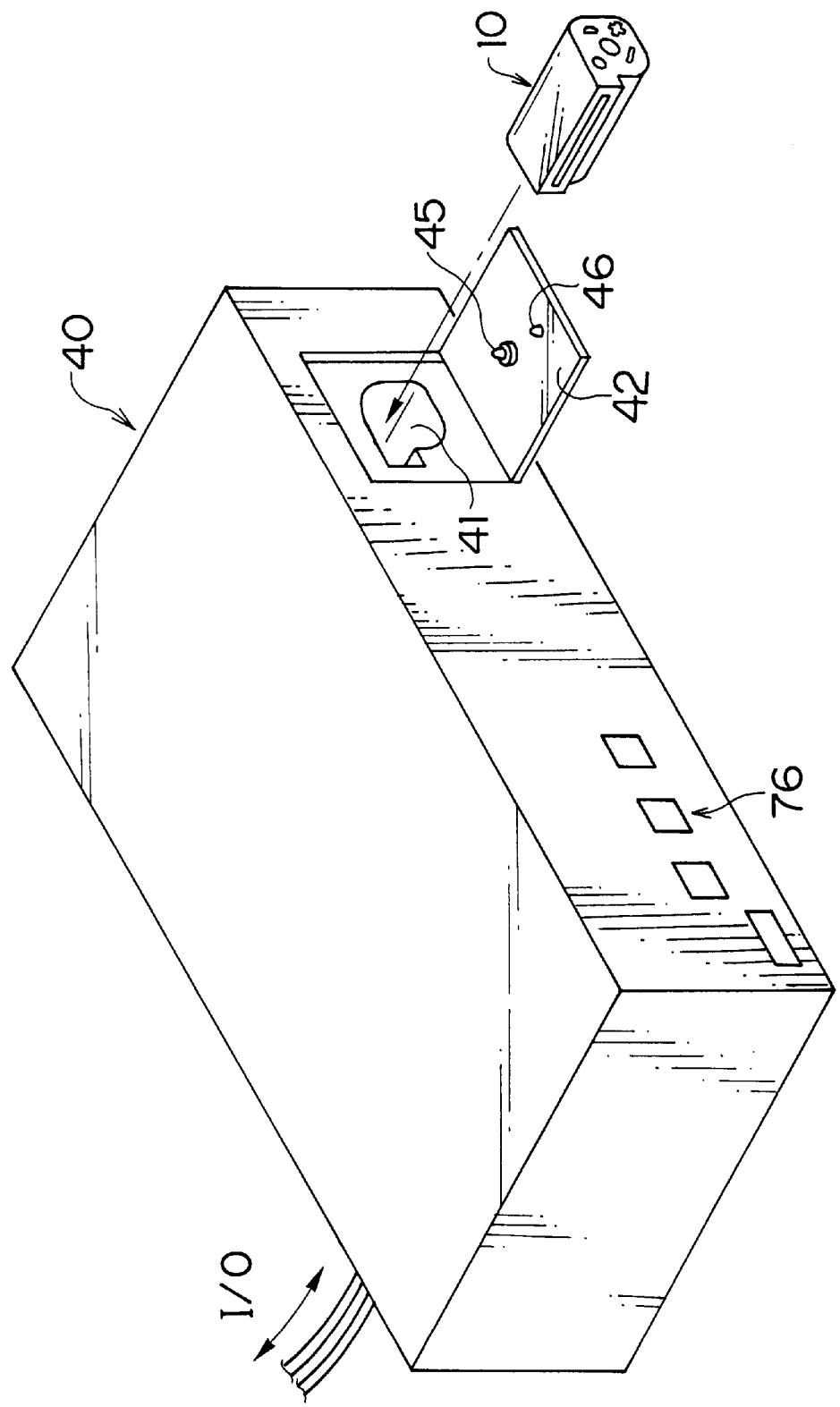
FIG. 7 is a perspective view illustrating the appearance of an apparatus that uses the film cartridge with the IC memory according to the present invention.

FIG. 7 is a perspective view illustrating the appearance of an exemplary apparatus using the film cartridge 10 with the IC memory 20 according to the present invention, and specifically, a film image reproducing apparatus 40. The film cartridge 10 contains a developed film 103, and the IC memory 20 contains an index image signal that represents a plurality of frame images on the film 103. The index image signal can be stored by means of a photofinishing apparatus for example. Specifically, the photofinishing apparatus reads a plurality of frame images on the film 103, compresses the image signal representing the frame images to produce the index image signal, and stores the index image signal in the IC memory unit 20.

The film cartridge 10 in FIG. 1 is loaded in a cartridge loading chamber 41 of the film image reproducing apparatus 40 so that the reference side of the film cartridge 10 faces the rear end of the cartridge loading chamber 41. Then, a chamber door 42 is closed.

Figure 8:
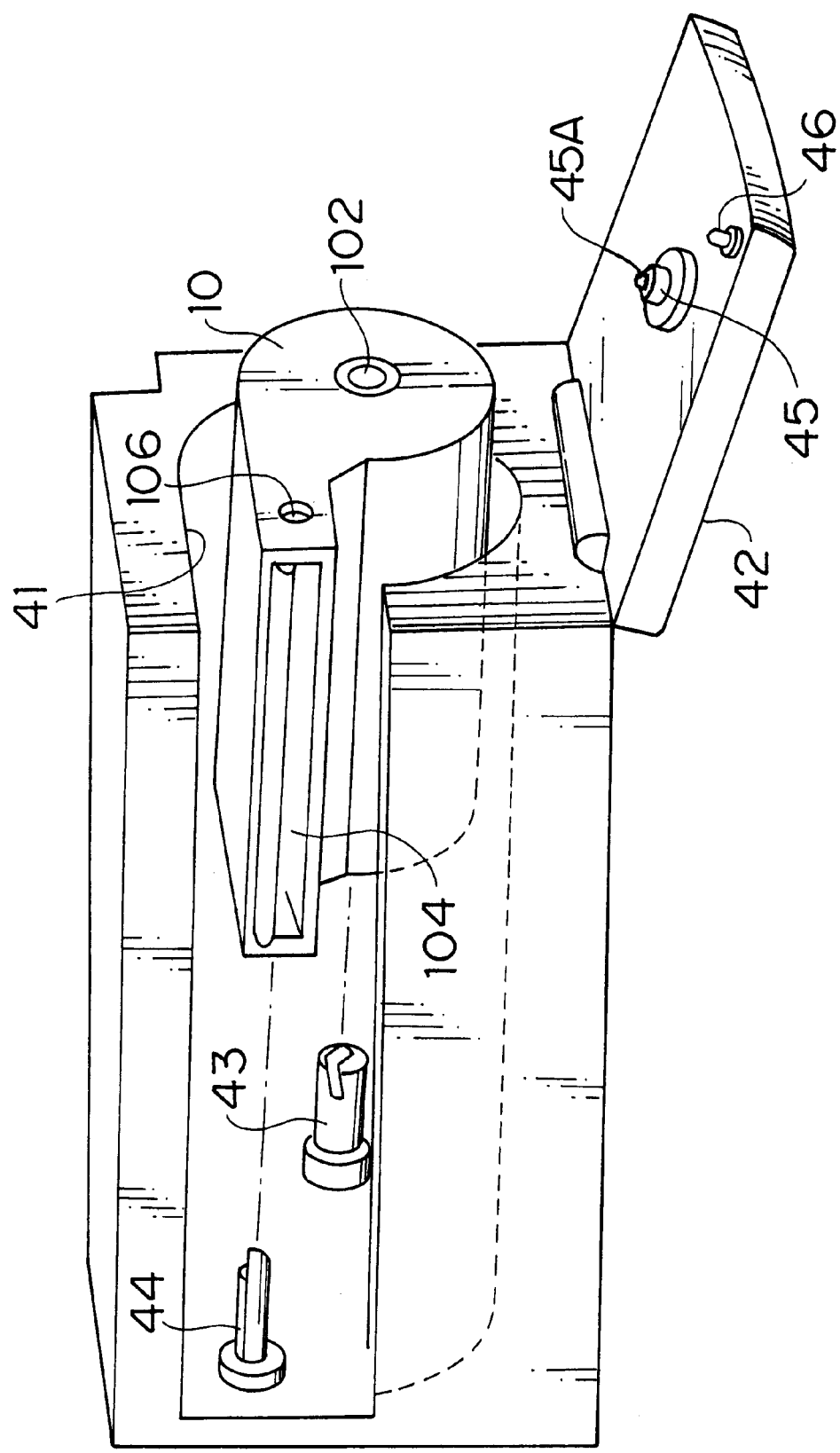
FIG. 8 is a perspective view illustrating an outline of a cartridge loading part of the apparatus in FIG. 7.

As shown in FIG. 8, a spool drive shaft 43 and a door driver 44 are provided on the bottom end of the cartridge loading chamber 41. The spool drive shaft 43 and the door driver 44 engage with the spool 102 and the door driving hole 106 of the film cartridge 10. The chamber door 42 on the cartridge chamber 41 is provided with guide shafts 45 and 46 that engage the spool 102 and the door driving hole 106 of the film cartridge 10. The guide shaft 45 is rotatable on an axis 45A and is elastically movable back and forth in the axial direction.

Figure 9:
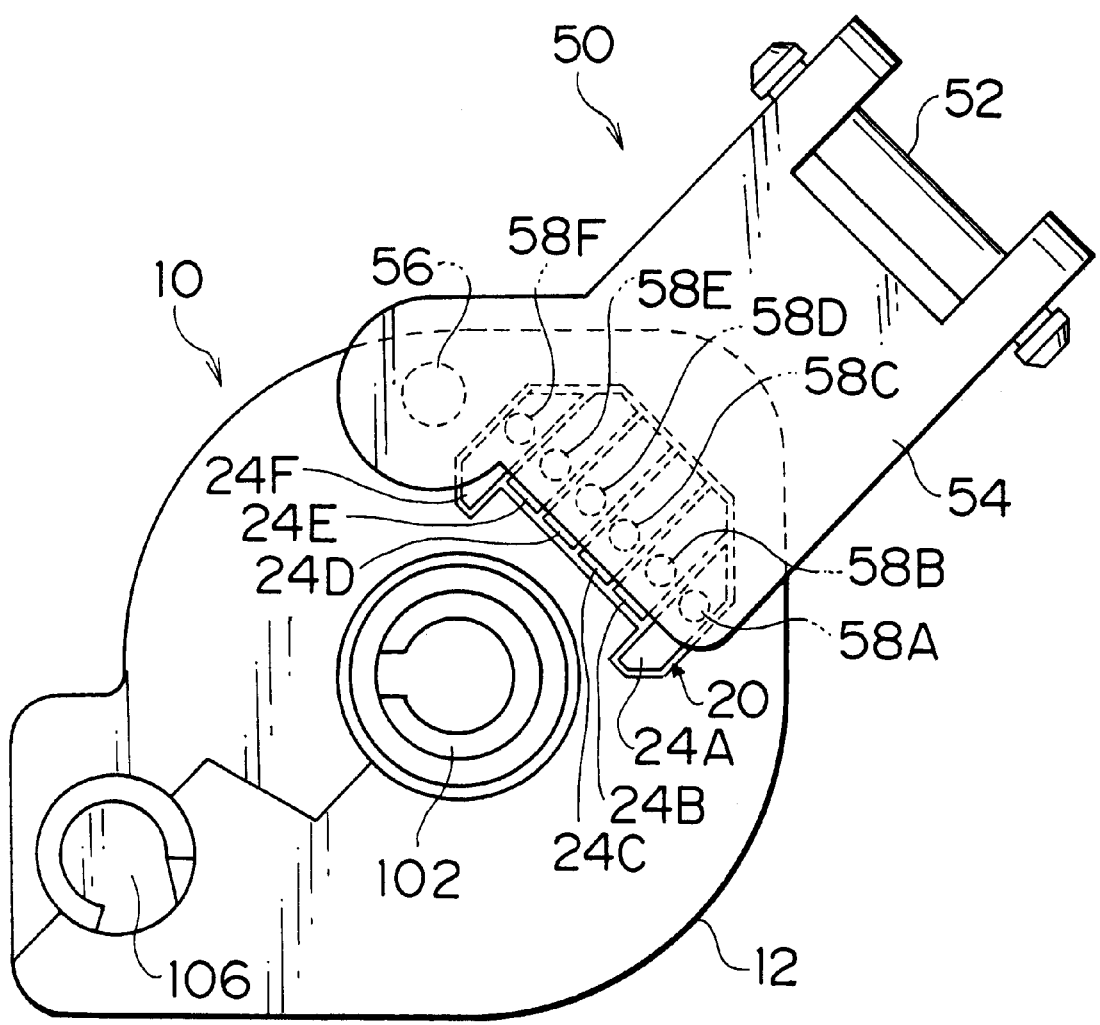
FIG. 9 is a plan view illustrating an embodiment of a contact unit for the film cartridge with the IC memory in FIG. 1.

A contact unit 50 in FIG. 9 is arranged at the rear end of the cartridge loading chamber 41. The contact unit 50 is not illustrated in FIG. 8.

The contact unit 50 consists of an arm 54 that is rotatable on a shaft 52, and a positioning pin 56 and six contact pins 58A, 58B, 58C, 58D, 58E, 58F that are arranged at the end of the arm 54. The contact pins 58A–58F are elastically retractable on the arm 54.

Figure 10:
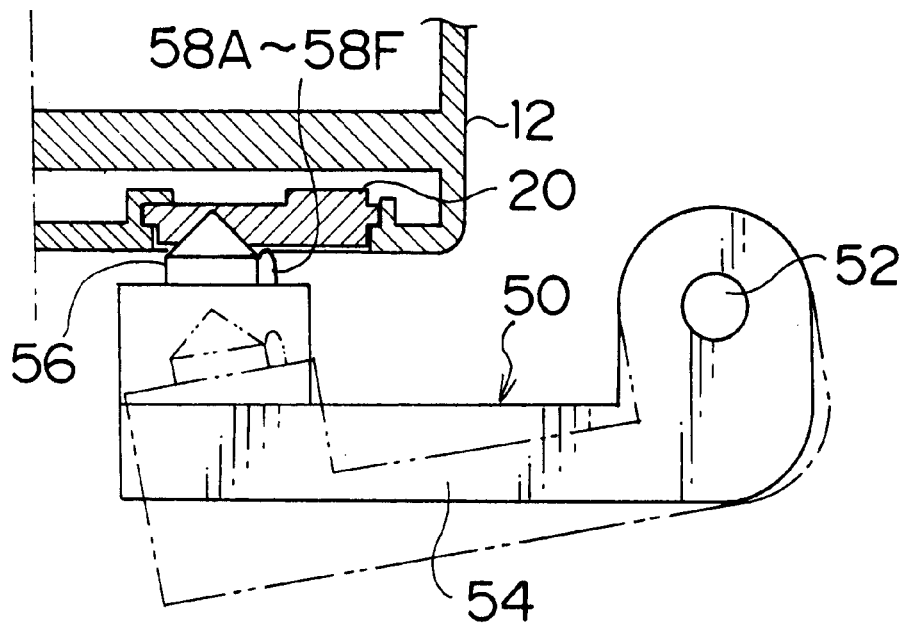
FIG. 10 is a side view including a partial section of FIG. 9.
Figure 11:
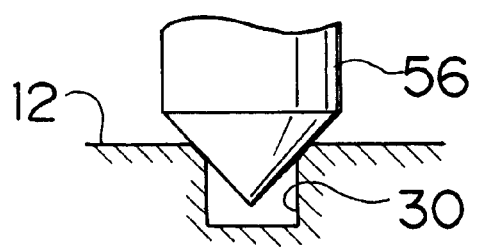
FIG. 11 is a view showing a relationship between a positioning hole of the film cartridge with the IC memory in FIG. 1, and a positioning pin of the contact unit.

As shown in FIG. 10, the contact unit 50 swings between a position indicated with a solid line and a position indicated with an alternate long and two short dashes line. When the contact unit 50 is located at the position indicated with the solid line, the conical tip of the positioning pin 56 fits in the positioning hole 30 on the cartridge shell 12 as shown in FIG. 11, and the contact pins 58A–58F elastically come into contact with the terminals 24A–24F, respectively. The cartridge shell 12 is positioned by the positioning pin 56, which is inserted into the positioning hole 30, and the door driver 44, which is engaged with the door driving hole 106. The positioning of the cartridge shell 12 causes the terminals 24A–24F to be fixed at predetermined positions. Consequently, the contact pins 58A–58F can come into contact with the terminals 24A–24F, respectively, without fail.

On the other hand, when the contact unit 50 is located at the position indicated with the alternate long and two short dashes line, the positioning pin 56 and the contact pins 58A–58F retreat from the positioning hole 30 and the terminals 24A–24F, and the cartridge shell 12 floats.

The apex of the conical tip of the positioning pin 56 may be eccentric from the axis of the positioning pin 56 in order to easily engage the positioning hole 30 while the contact unit 50 is swinging. The outer diameter of the positioning pin may be smaller than the inner diameter of the positioning hole 30. Moreover, a leaf spring, a wire spring, and a conductive rubber contact that are provided with a projection may be used instead of the contact pin. In this embodiment, one contact is connected to one terminal, but a plurality of contacts may be connected to one terminal in order to ensure the reliability and durability.

Figure 12:
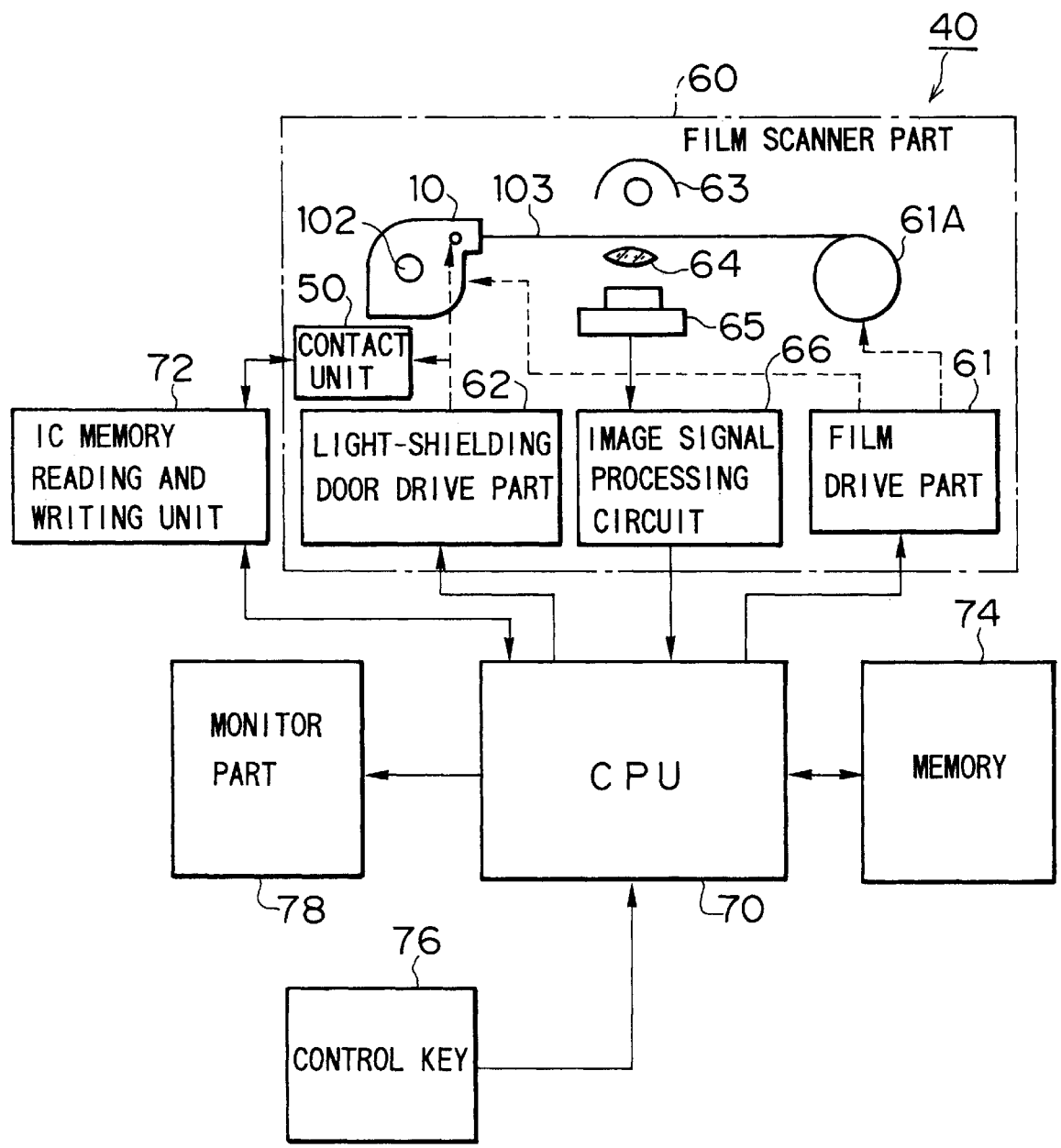
FIG. 12 is a block diagram illustrating the inner structure of a film image reproducing apparatus in FIG. 7.

FIG. 12 is a block diagram illustrating the inner structure of the film image reproducing apparatus 40 in FIG. 7.

As shown in FIG. 12, the film image reproducing apparatus 40 comprises a film scanner part 60, a central processing unit (CPU) 70, an IC memory reading and writing part 72, a memory 74 and a control key 76.

A film drive part 61 of the film scanner part 60 comprises a film supply part that rotates the spool drive shaft 43 forward and backward, a film rewinding part including a film rewinding shaft 61A that takes up the film 103 supplied from the film supply part, and a means that transports the film 103 at a desired speed by pinching the film 103 with a capstan and a pinch roller (not shown). The film drive part 61 transports the film 103 between the film supply part and the film rewinding part in accordance with control signals from the CPU 70.

A light-shielding door drive part 62 drives the door driver 44 in FIG. 8 to open and close the light-shielding door 104 of the film cartridge 10. When the film 103 is supplied from the film cartridge 10 after the film cartridge 10 is loaded in the cartridge loading chamber 41 and the chamber door 42 is closed, the light-shielding door drive part 62 opens the light-shielding door 104. When the film cartridge 10 is unloaded from the cartridge loading chamber 41 after the film 103 is completely wound into the film cartridge 10, the light-shielding door drive part 62 closes the light-shielding door 104. The light-shielding door drive part 62 operates in accordance with control signals from the CPU 70.

A mechanism (not shown) swings the contact unit 50 between the position indicated with the solid line and the position indicated with the alternate long and two short dashes line in FIG. 10, and the mechanism operates in connection with the operation of the light-shielding door drive part 62. When the light-shielding door 104 of the film cartridge 10 is closed, the contact unit 50 is located at the position indicated with the solid line, that is, the contact unit 50 positions the cartridge shell 12 and makes the contact pins 58A–58F connect to the terminals 24A–24F, respectively. When the light-shielding door 104 is opened, the contact unit 50 moves back to the position indicated with the alternate long and two short dashes line.

A light source 63 illuminates the film 103 that is transported between the film supply part and the film rewinding part by the film drive part 61. An image light of the film 103, which is illuminated by the light source 63, is formed on a photo reception surface of a line sensor 65. Then, each sensor on the line sensor 65 transforms the image light into signal charge according to the light intensity. The accumulated signal charge is read to a shift register by read gate pulses which are supplied from a CCD drive circuit (not shown) in a predetermined cycle. The signal charge is sequentially read out as an image signal by means of register transfer pulses.

The image signal is sequentially read from the line sensor 65 as stated above, and an image signal processing circuit 66 executes the required signal processing with respect to the image signal. Then, the image signal is stored in the memory 74. The image signal of one frame, which is stored in the memory 74, is repeatedly read out, and they are output to a monitor part 78 such as a television, which is connected to the film image reproducing apparatus 40. Consequently, a frame image of one frame on the film 103 is shown on the monitor part 78.

After the film cartridge 10 is loaded in the cartridge loading chamber 41 and the chamber door 42 is closed and before the light-shielding door 104 of the film cartridge 10 is opened (i.e. while the contact unit 50 positions the cartridge shell 12 and the contact pins 58A–58F connect to the terminals 24A–24F), the film image reproducing apparatus 40 reads the index image signal from the IC memory unit 20, which is loaded in the film cartridge 10, through the IC memory reading and writing part 72 and stores the index image signal in the memory 74. The index image signal is repeatedly read from the memory 74 and output to the monitor part 78, so that the index image can be shown on the monitor part 78.

In this embodiment, the index image signal is previously stored in the IC memory unit 20 of the film cartridge 10; however, the film image reproducing apparatus 40 may store original image information of the film 103 that is read by the film image reproducing apparatus 40, the image information that is obtained by compressing the original image information, or index image information into the IC memory unit 20 through the IC memory reading and writing part 72. The information to be stored in the IC memory unit 20 is not restricted to the image information; laboratory information (frame numbers subject for extra printing, the number of prints, suitable exposure information, trimming information, etc.) may also be stored in the IC memory unit 20 by manipulation of the control key 76.

Moreover, in this embodiment, the contact unit 50 is moved by the mechanism that acts in connection with the opening and closing action of the light-shielding door drive part 62, but the present invention is not restricted to this. For instance, in connection with a spool lock lever that locks and unlocks the rotation of the spool drive shaft 43, the contact unit 50 comes into contact with the cartridge shell 12 when the spool is locked, and the contact unit 50 retreats from the cartridge shell 12 when the spool lock is released. It is possible to provide a means which drives the contact unit 50 independently. It is also possible to provide a means which separately drives the positioning member for the cartridge shell 12 and the contact members to come into contact with the terminals of the IC memory unit.

Further, in this embodiment, the film image reproducing apparatus is the example of the apparatus using the film cartridge with the IC memory; however, the apparatus may be a camera, a photofinishing apparatus, etc. Furthermore, the IC memory unit on the film cartridge may contain information to be recorded in the data disk (see FIG. 19(A)) of the conventional film cartridge 100, and the camera may store the camera information such as a shutter speed, a stop value, the date and a title of the exposure in the IC memory unit.

A description will be given of another positioning mechanism that positions the cartridge shell of the film cartridge with the IC memory.

Figure 13:
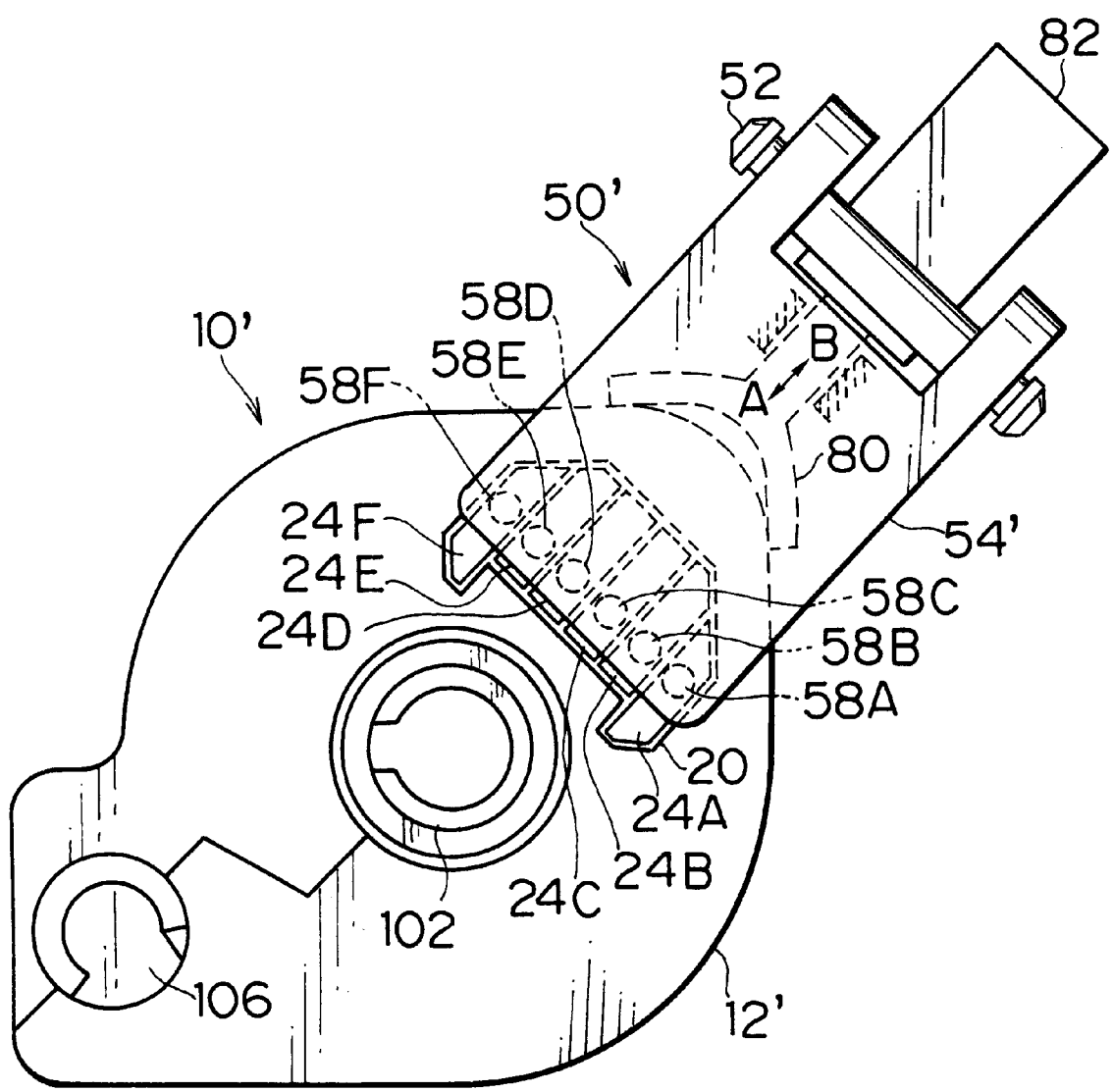
FIG. 13 is a plan view illustrating another embodiment of a positioning mechanism and a contact unit that are applied to the apparatus that uses the film cartridge with the IC memory according to the present invention.

The film cartridge 10' in FIG. 13 is different from the film cartridge 10 in FIG. 9 in that the positioning hole is not formed in the cartridge shell 12'.

The positioning mechanism that positions the cartridge shell 12' of the film cartridge 10' includes a solenoid 82 that moves a plunger 80, whose end is substantially U-shaped as shown in FIG. 13, in the direction of an arrow A–B. The plunger 80 is always forced by a spring (not shown) in the direction of the arrow B, and the solenoid 82 moves the plunger 80 in the direction of the arrow A against the pressure force from the spring when the solenoid 82 is supplied with a current.

To position the cartridge shell 12' of the film cartridge 10', the current is supplied to the solenoid 82 to move the plunger 80, and the plunger 80 is forced in the direction of the arrow A. Then, the substantially U-shaped end of the plunger 80 presses the cartridge shell 12'. Since the door driver 44 engages the door driving hole 106, the substantially U-shaped end of the plunger 80 comes into contact with two positions of the cartridge shell 12', so that the cartridge shell 12' can be positioned.

When the supply of the electricity to the solenoid 82 is stopped, the plunger 80 moves back in the direction of the arrow B with support of the urging force from the spring, and the cartridge shell 12' starts floating.

A contact unit 50' in FIG. 13 is different from the contact unit 50 in FIG. 9 in that the positioning pin 56 is not formed at the end of the arm 54'. The position of the contact unit 50' is controlled in synchronism with the positioning of the cartridge shell 12'.

Instead of the above-mentioned positioning mechanism, any other positioning mechanisms may be used that come into contact with at least two positions on the outer peripheral surface of the cartridge shell to position the cartridge shell.

A description will now be given of a driving mechanism for the contact unit.

Figure 14:
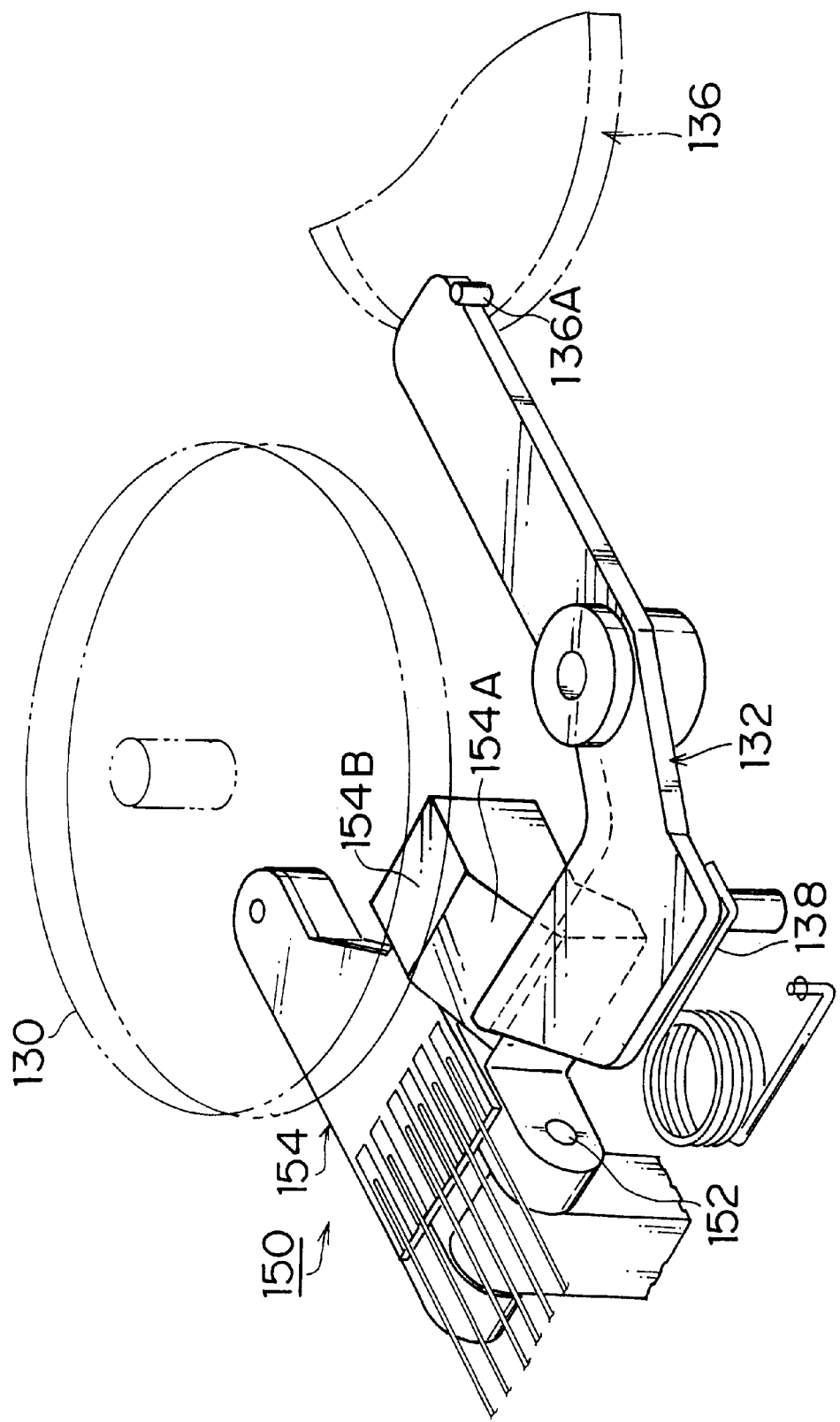
FIG. 14 is a perspective view illustrating the essential parts of a drive mechanism of the contact unit arranged below the cartridge loading chamber.
Figure 15:
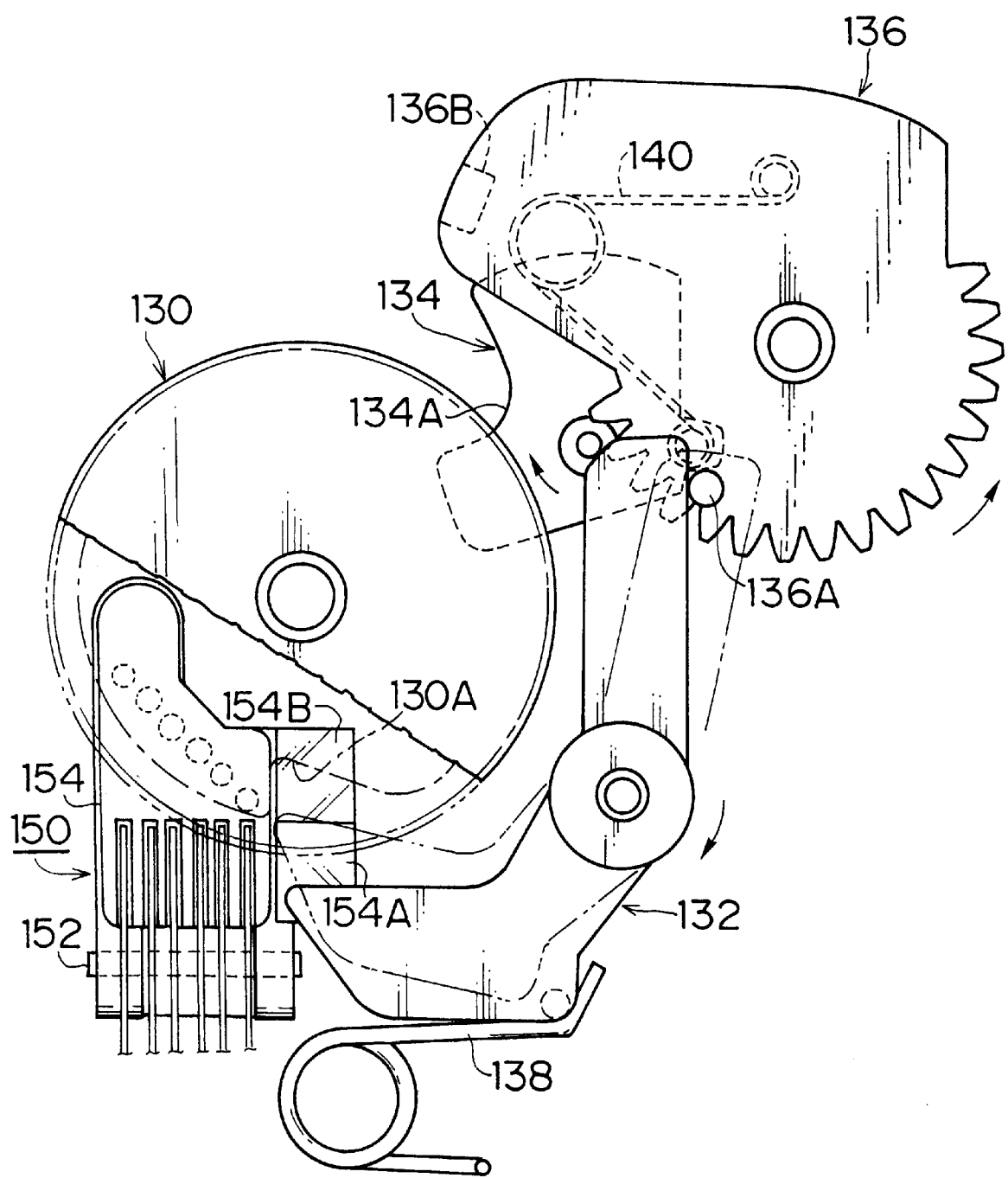
FIG. 15 is a plan view illustrating the essential parts of the contact unit and the drive mechanism arranged below the cartridge loading chamber.

FIG. 14 is a perspective view illustrating the essential parts of a driving mechanism for a contact unit, which is provided below the cartridge loading chamber, and FIG. 15 is a plan view of FIG. 14. In FIGS. 14 and 15, reference numeral 130 is a spool drive gear, 132 is a spool lock lever, 134 is a door driver driving member, 136 is a driving member with a gear, and 150 is the contact unit.

The spool drive gear 130 is integrated with the spool drive shaft 43 (see FIG. 8). A driving means (not shown) transmits a rotational driving force to the spool drive gear 130 to rotate the spool drive shaft 43 forward or backward. The spool lock lever 132 is forced clockwise in FIG. 15 by the tension coil spring 138 so as to engage a coupling part 130A that is formed at the bottom of the spool drive gear 130, thus locking the spool drive shaft 43. The rear end of the spool lock lever 132 is able to engage a pin 136A that provided on the driving member 136.

In FIG. 15, the spool lock lever 132 is forced clockwise by the tension coil spring 138, but the spool lock lever 132 remains stationary at the position represented with the solid line since the rear end of the spool lock lever 132 is engaged with to the pin 36A that is provided on the driving member 136. If the driving member 136 is rotated counterclockwise in the above-mentioned state, the spool lock lever 132 is rotated clockwise by the urging force from the tension coil spring 138, so that the spool lock lever 132 can engage the coupling part 130A of the spool drive gear 130.

If the driving member 136 is rotated clockwise while the spool lock lever 132 engages the coupling part 130A of the spool drive gear 130, the pin 136A comes into contact with the rear end of the spool lock lever 132 to rotate the spool lock lever 132 counterclockwise against the urging force from the tension coil spring 138, thereby unlocking the spool.

The door driver driving member 134 is integrated with the door driver 44 (see FIG. 8). One end of a tension coil spring 140 is fixed to the door driver driving member 134. In FIG. 15, the door driver driving member 134 is forced clockwise by the urging force from the tension coil spring 140. The door driver driving member 134 stops in contact with a stopper (not shown) in FIG. 15. If the driving member 136 rotates counterclockwise, a projection 136B formed at the bottom of the driving member 136 engages a concave 134A of the door driver driving member 134 to rotate the door driver driving member 134 counterclockwise against the urging force from the tension coil spring 140. If the door driver driving member 134 rotates at more than a predetermined angle, the direction in which the tension coil spring 140 forces the door driver driving member 134 is inverted (counterclockwise), and the door driver driving member 134 rotates until it comes into contact with another stopper (not shown). Upon rotation of the door driver member 134, the light-shielding door 104 of the film cartridge 10 is closed.

After the light-shielding door 104 of the film cartridge 10 is closed, the driving member 136 further rotates counterclockwise to release the lock mechanism of the chamber door 42, thus allowing the film cartridge 10 to be taken out from the cartridge loading chamber 41.

The contact unit 150 comprises an arm 154 that is rotatable about a shaft 152, and six contact pins that are provided at the end of the arm 154. The arm 154 has two surfaces on which the bottom end of the spool lock lever 132 slides, specifically, a slant surface 154B and a top surface 154A adjacent to the slant surface 154A. The contact unit 150 is forced by a spring (not shown) in such a direction that the contact pins retreat from the film cartridge 10.

When the spool lock lever 132 rotates clockwise in FIG. 15, the bottom surface of the spool lock lever 132 moves on the slant surface 154A of the arm 154, thereby pressing the arm 154 downward against the urging force of the spring. The rotation of the arm 154 causes the contact pins to come into contact with the terminals on the film cartridge under pressure.

A description will now be given of the operating procedure of the above-mentioned mechanism. FIGS. 14 and 15 show the state wherein the spool lock lever 132 retreats and the door driver driving member 134 rotates to the light-shielding door opening position. As a result, the film can be transported, and the contact pins of the contact unit 150 retreat from the terminals on the film cartridge.

In order to unload the film cartridge in the above-mentioned state, the spool drive gear 130 is rotated counterclockwise to rewind the whole film into the film cartridge, and then the driving member 136 is rotated counterclockwise. The rotation of the driving member 136 causes the spool lock lever 132 to rotate clockwise, thereby pressing the arm 154 downward so that the contact pins can be pressed to the terminals on the film cartridge. When the spool lock lever 132 further rotates clockwise, the spool lock lever 132 reaches a position where it can engage the coupling part 130A of the spool drive gear 130. When the spool drive gear 130 is rotated counterclockwise, the coupling part 130A is engaged with the spool lock lever 132, so that the spool of the film cartridge can stop at a predetermined position where the square hole (see FIG. 19(B)) is shown in white to indicate that the film cartridge contains the developed film.

When the driving member 136 is further rotated counterclockwise, the projection 136B of the driving member 136 engages the concave 134A of the door driving member 134. The door driver driving member 134 rotates counterclockwise to close the light-shielding door 104 of the film cartridge 10.

The rotation of the driving member 136 is stopped in the state wherein the light-shielding door 104 is closed. Necessary information is written in the IC memory unit of the film cartridge through the contact unit 150. If the driving member 136 is further rotated counterclockwise after the information is written, the lock mechanism of the chamber door 42 is released to allow the film cartridge 10 to be taken out.

After the film cartridge 10 is loaded in the cartridge loading chamber 41, the procedure to the state in FIGS. 14 and 15 is reverse to the above-mentioned procedure. The information is read from the IC memory unit of the film cartridge 10 after the chamber door 42 is closed and before the light-shielding door 104 is opened.

A description will now be given of the operating sequence of the film image reproducing apparatus 40 that is able to use the film cartridge 10 with the IC memory.

Figure 16:
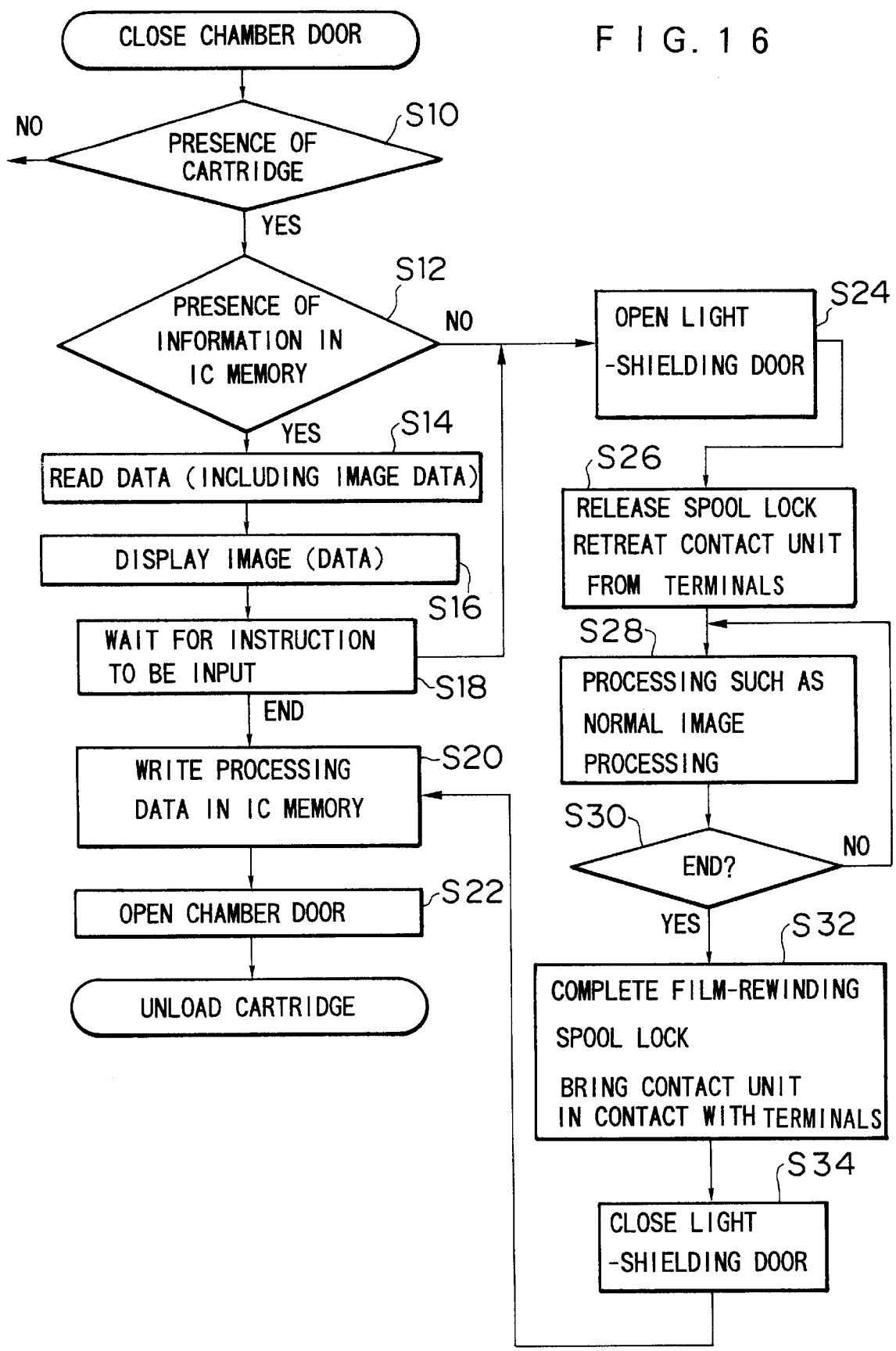
FIG. 16 is a flow chart showing the operation sequence of the film image reproducing apparatus.

FIG. 16 is a flow chart showing the operating sequence of the film image reproducing apparatus 40. When the chamber door 42 is closed, whether the film cartridge is loaded or not is detected (S10). Whether the chamber door 42 is closed or not and whether the film cartridge is loaded or not can respectively be detected by means of switches (not shown). If the cartridge is not loaded, the film image reproducing apparatus 40 waits for another instruction such as to open the chamber door.

On the other hand, if the film cartridge is loaded, whether the information is stored in the IC memory or not is determined (S12) because the IC memory unit of the film cartridge 10 is connected to the contact unit when the chamber door is closed. If it is determined that the information (including the image data of an index image, etc.) is stored in the IC memory, the information is read (S14). The image such as the index image is displayed in accordance with the read information. If other data is written in the IC memory, the data is displayed (S16). Thereby, the user can immediately identify a frame image which is captured onto the photographic film in the film cartridge.

The film image reproducing apparatus 40 waits for an instruction while the image is displayed in the above-mentioned manner (S18). If there is some processing data when the film image reproducing apparatus 40 is instructed to end the process (to unload the cartridge), the processing data is written (S20). Then, the chamber door is opened (S22), and the film cartridge is unloaded.

If it is determined that no information is stored in the IC memory at S12, or if the film image reproducing apparatus 40 is instructed to reproduce an image outside the IC memory at S18, the light-shielding door of the film cartridge is opened (S24). Then, the lock of the spool is released, and the contact unit is retreated (S26).

Thereafter, the film image reproducing apparatus 40 executes a normal image reproduction, etc. Specifically, the frame images on the film are read, and the read frame images are displayed on a frame-by-frame basis. An index image representing a plurality of frame images is produced and displayed. The displayed frame images are edited, and a print order, etc. are entered as the need arises.

When the film image reproducing apparatus 40 is instructed to end the process (S30), the entire film is wound into the film cartridge, the spool is locked, and the contact unit is pressed against the terminals of the IC memory (S32). Then, the light-shielding door of the film cartridge is closed (S34), and the process goes on to S20. At S20, the editing information, the print order information and other data (including the image data) are written in the IC memory. Then, the chamber door is opened (S22), and the film cartridge is unloaded. The data may also be written between S32 and S34. If there is provided a driving means that retreats the contact unit from the terminals and brings the contact unit in contact with the terminals independently of the spool locking/unlocking action and the light-shielding door opening/closing action, the information may be read from or written in the IC memory unit in the state wherein the film is outside the film cartridge. In this case, however, the contact pins of the contact unit are pressed against the terminals after the film is stopped, and the information is read or written. After the information is read or written, the contact pins are retreated from the terminals, and then the film is permitted to be transported.

A description will now be given of a cleaning mechanism that cleans the surfaces of the terminals to ensure that the current is carried through the contact parts.

In FIG. 17, a contact unit 250 has an arm 254 that is rotatable about a shaft 252, and a plurality of contact pins 258 that are arranged at the end of the arm 254 and connect to a plurality of terminals 24 of the film cartridge. Each contact pin 258 is retractably provided at the arm 254 with support of elasticity of a coil spring 259.

As described with reference to FIG. 14, the arm 254 of the contact unit 250 rotates in association with the spool lock lever 132 to thereby bring the contact pins 258 in contact with the terminals 24 of the film cartridge or retreat the contact pins 258 from the terminals 24.

The contact unit 250 is provided with the cleaning mechanism. The cleaning mechanism consists of a support mechanism that supports a base 254A of the arm 254 in such a manner that the base 254A is movable horizontally, and a solenoid 300 that moves the base 254A horizontally.

A description will be given of the operation of the cleaning mechanism.

Figure 17A:
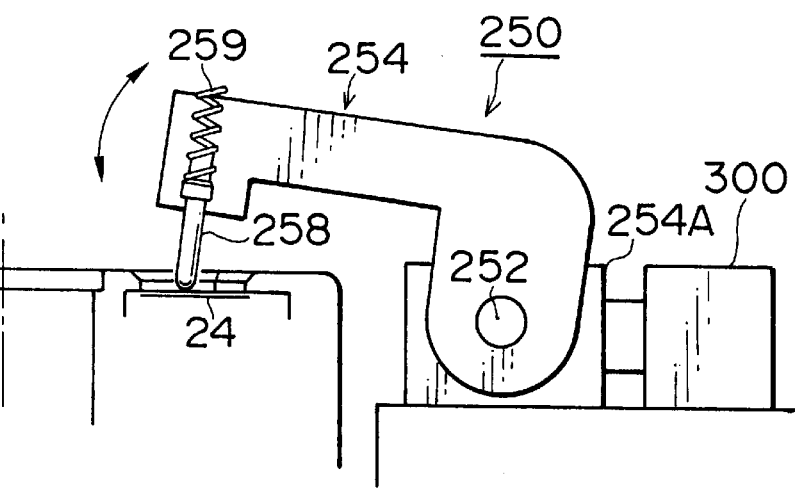
FIGS. 17(A) and 17(B) are views illustrating the state wherein the contact unit is retreated from and brought in contact with the contacts for explaining a cleaning function of the contact unit.
Figure 17B:
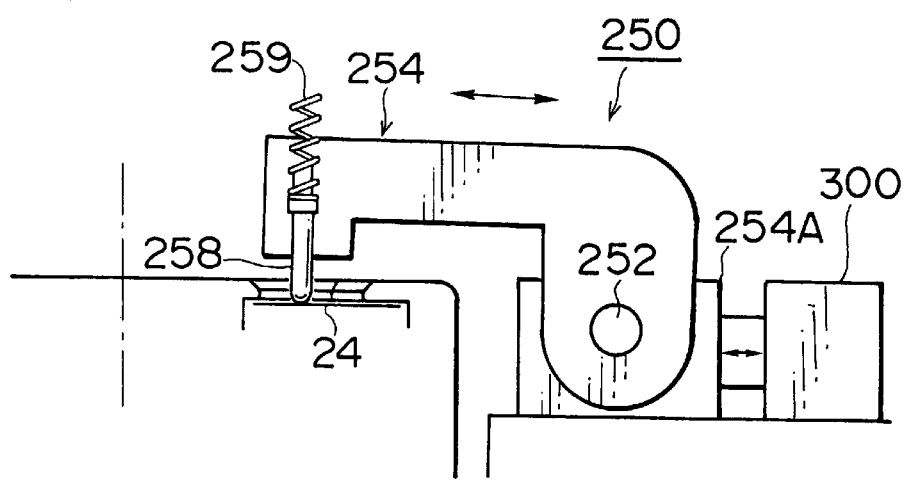

First, in order to read and write the information from the retreated state shown in FIG. 17(A), the arm 254 is rotated to a position shown in FIG. 17(B) so as to connect the contact pins 258 to the terminals 24. As a result, the contact pins 258 are pressed against the terminals 24 of the film cartridge by the urging force of the coil spring 259. When the film cartridge is loaded in the cartridge loading chamber, the contact unit 250 waits at the position shown in FIG. 17(B), and the contact pins 258 are pressed against the terminals 24 when the chamber door is closed.

Then, the solenoid 300 is driven to move the contact unit 250 horizontally in the contact state shown in FIG. 17(B). The contact pins 258 that are pressed against the terminals 24 so as move on the terminals 24 to clean the surface of the terminals 24.

In this embodiment, the contact unit as a whole is moved when the terminals are cleaned, but the arm 254 may be divided so that only the end of the arm that is provided with the contact pins 258 can be moved.

FIGS. 18(A) and 18(B) are views illustrating another embodiment of the contact unit according to the present invention. A contact unit 350 has wire springs 352 as contact members. As shown in FIG. 18(A), the wire springs 352 are tilted a predetermined angle a with respect to the surfaces of the terminals 24 before the wire springs 352 are pressed against the terminals 24.

If the contact unit 350 is moved downward in FIG. 18(A) by an over stoke for connection (or if the terminals 24 move upward when the film cartridge is loaded), contact points 352A of the wire springs 352 move on the terminals 24 from the contact starting point by a distance L. Thereby, the surfaces of the terminals 24 can be cleaned. The same effects can be achieved if leaf springs are used instead of the wire springs.

The cartridge shell positioning mechanism, which was described with reference to FIGS. 10, 13, etc. may position and fix the cartridge shell during the cleaning. This prevents the cartridge shell from moving during the cleaning. In this case, the positioning mechanism of the cartridge shell must be driven independently of the contact unit.

As set forth hereinabove, according to the film cartridge with the IC memory of the present invention, the cartridge shell can easily be positioned when the information is read from or written in the IC memory unit which is provided in the cartridge shell.

Moreover, according to the apparatus that uses the film cartridge with the IC memory of the present invention, the cartridge shell is floating while the film is transported, and the cartridge shell can be positioned when the information is read from or written to the IC memory unit. Thus, the contact members can come into contact with the terminals of the IC memory on the cartridge without fail even if the number of terminals is increased and each terminal becomes smaller.

Further, according to the apparatus that uses the film cartridge with the IC memory of the present invention, the contact members that are pressed against the terminals move on the surfaces of the terminals so as to clean the surfaces of the terminals. For this reason, the current can be carried through the contact parts without fail when the information is read from or written to the IC memory.

Furthermore, according to the method of the present invention, the information can be read from and written to the IC memory of the film cartridge at such a proper timing as not to disturb the transport of the film. In particular, the information is read from the IC memory before the photographic film is pulled out from the film cartridge, when the film cartridge with the IC memory is loaded in the cartridge loading chamber and the chamber door is closed. For this reason, the information of the photographic film (including the frame images) can be obtained without pulling out the photographic film from the film cartridge.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An apparatus using a film cartridge, comprising:
a cartridge loading chamber for containing the film cartridge, said cartridge loading chamber having, at the rear end thereof, a spool drive shaft and a door driver respectively engaging a spool having a continuous photographic film wound thereon, and a light-shielding door opening and closing hole of said film cartridge;
a chamber door for opening and closing said cartridge loading chamber, said chamber door being provided with at least one guide shaft, said at least one guide shaft respectively engaging said spool and said light-shielding door opening and closing hole of the film cartridge when said chamber door is closed;
a positioning mechanism including at least one positioning member engaging at least one positioning hole or at least one positioning notch located on a cartridge shell of the film cartridge, said positioning mechanism positioning said cartridge shell at a predetermined position in said cartridge loading chamber by engaging said positioning member with said at least one positioning hole or said at least one positioning notch;
a contact mechanism including at least one contact member coming into contact with at least one terminal of an IC memory unit provided on the film cartridge, said contact mechanism presenting said at least one contact member against said at least one terminal when said positioning mechanism positions said cartridge shell;
an information reading device for reading information from said IC memory unit and writing information to said IC memory unit via said at least one contact member in said contact mechanism; and
wherein said spool drive shaft, said door driver and said at least one guide shaft pivotally support said spool and said light-shielding door opening and closing hole of the film cartridge, said cartridge shell being able to float at least while a film is being transported therein, said positioning mechanism positions said cartridge shell at the predetermined position in said cartridge loading chamber when information is read from and written to said IC memory unit.

2. The apparatus according to claim 1, wherein said positioning mechanism and said contact mechanism comprise an arm in which said positioning member and said at least one contact member are arranged at an end thereof, and an arm driving mechanism rotating said arm to bring said at least one contact member into contact with said at least one terminal of said IC memory unit.

3. An apparatus using a film cartridge including a cartridge shell containing a continuous photographic film, an inside of said cartridge shell being substantially cylindrical, said cartridge shall having an opening through which said continuous photographic film protrudes, a light-shielding door arranged on said opening, a light-shielding door opening and closing hole for opening and closing said light-shielding door, an IC memory unit, at least one terminal of said IC memory unit being exposed on a surface of said cartridge shell, and a spool rotatably arranged in said cartridge shell with a predetermined play, one end of said film in longitudinal direction thereof being fixed to said spool, said continuous photographic film being wound about said spool, comprising:
a cartridge loading chamber for containing the film cartridge, said cartridge loading chamber having, at the rear end thereof, a spool drive shaft and a door driver respectively engaging said spool and said light-shielding door opening and closing hole on said film cartridge;
a chamber door for opening and closing said cartridge loading chamber, said chamber door being provided with at least one guide shaft respectively engaging said spool and said light-shielding door opening and closing hole of said film cartridge;
a positioning mechanism including at least one positioning member coming into contact with at least two positions on the outer periphery of said cartridge shell, said positioning mechanism positioning said cartridge shell at a predetermined position in said cartridge loading chamber by bringing said positioning member into contact with the outer periphery of said cartridge shell;
a contact mechanism including at least one contact member coming into contact with said at least one terminal of said IC memory unit, said contact mechanism bringing said at least one contact member into contact with said at least one terminal only when said positioning mechanism positions said cartridge shell;
an information reading device for reading information from said IC memory unit and writing information to said IC memory unit via said at least one contact member in said contact mechanism; and
wherein said spool drive shaft, said door driver and said at least one guide shaft pivotally support said spool and said light-shielding door opening and closing hole of said film cartridge, said cartridge shell being able to float at least while said continuous photographic film is being transported therein, said positioning mechanism positions said cartridge shell at the predetermined position in said cartridge loading chamber when the information is read from and written to said IC memory unit.

4. The apparatus according to claim 1 or 3, wherein said positioning mechanism and said contact mechanism retreat said positioning member and said at least one contact member in association with a light-shielding door opening action of a light-shielding door driving mechanism rotating said door driver or the unlocking action of a spool lock mechanism mechanically locking and unlocking said spool drive shaft, and said positioning mechanism and said contact mechanism bringing into contact said positioning member and said at least one contact members with said cartridge shell in association with a light-shielding door closing action of said light-shielding door driving mechanism or the locking action of said spool lock mechanism.

5. An apparatus using a film cartridge including a cartridge shell containing a continuous photographic film, an inside of said cartridge shell being substantially cylindrical, said cartridge shall having an opening through which said continuous photographic film protrudes, a light-shielding door arranged on said opening, a light-shielding door opening and closing hole for opening and closing said light-shielding door, an IC memory unit, at least one terminals of said IC memory unit being exposed on a surface of said cartridge shell, and a spool rotatably arranged in said cartridge shell with a predetermined play, one end of said continuous photographic film in longitudinal direction thereof being fixed to said spool, said continuous photographic film being wound about said spool, comprising:
a cartridge loading chamber for containing the film cartridge, said cartridge loading chamber having, at the rear end thereof, a spool drive shaft and a door driver respectively engaging said spool and said light-shielding door opening and closing hole on said film cartridge;
a chamber door for opening and closing said cartridge loading chamber, said chamber door being provided with at least one guide shaft respectively engaging said spool and said light-shielding door opening and closing hole of said film cartridge;

a positioning mechanism including at least one positioning member coming into contact with at least two positions on the outer periphery of said cartridge shell, said positioning mechanism positioning said cartridge shell at a predetermined position in said cartridge loading chamber by bringing said positioning member into contact with the outer periphery of said cartridge shell;

a contact mechanism including at least one contact member coming into contact with said at least one terminal of said IC memory unit, said contact mechanism bringing said at least one contact member into contact with said at least one terminal and retreating said at least one contact member from said at least one terminal;

an information reading device for reading information from said IC memory unit and writing information to said IC memory unit via said at least one contact member in said contact mechanism; and wherein said contact mechanism moves said at least one contact member on the surface of said at least one terminal so as to clean the surface of said at least one terminals.

6. The apparatus according to claim 5, wherein said contact mechanism comprises an arm elastically holding said at least one con tact member at an end thereof, a first drive mechanism rotating said arm to bring said at least one contact member into contact with said at least one terminals under pressure and retreating said at least one contact member from said at least one terminals, and a second drive mechanism moving at least said at least one contact member substantially parallel to the surface of said at least one terminal.

7. The apparatus according to claim 5, wherein said at least one contact member are comprised of wire springs or leaf springs, tilted at a predetermined angle with respect to the surface of said at least one terminals, said contact mechanism relatively moves said at least one contact member and said at least one terminal relatively to one another in a cartridge loading/unloading directions so as to bring said at least one contact member into contact with said at least one terminal under pressure and retreat said at least one contact member from said at least one terminal, and ends of said at least one contact member slide on the surface of said at least one terminal when said at least one contact member is brought into contact with and retreated from said at least one terminal.

8. The apparatus according to claim 5, 6 or 7, wherein said at least one terminal of said IC memory unit is arranged on a side of said cartridge shell perpendicular to a direction in which said film cartridge is loaded into said cartridge loading chamber.

9. The apparatus according to claim 5, further comprising:

a positioning mechanism including a positioning member coming into contact with at least two positions on the outer periphery of said cartridge shell, said positioning mechanism positioning said cartridge shell at a predetermined position in said cartridge loading chamber by bringing said positioning member into contact with the outer periphery of said cartridge shell; and wherein said spool drive shaft, said door driver and said at least one guide shaft pivotally support said spool and said light-shielding door opening and closing hole of said film cartridge, said cartridge shell is able to float at least while said continuous photographic film is being transported, said positioning mechanism positions said cartridge shell at the predetermined position in said cartridge loading chamber when the information is read from and written to said IC memory unit.

10. The apparatus according to claim 5, wherein:

at least one positioning hole or at least one positioning notch for positioning said cartridge shell is provided on a side of said cartridge shell of said film cartridge;

said apparatus further including a positioning mechanism including a positioning member engaging said at least one positioning hole and said at least one positioning notch on said cartridge shell, said positioning mechanism positioning said cartridge shell at a predetermined position in said cartridge loading chamber by engaging said positioning member with said at least one positioning hole or said at least one positioning notch; and said spool drive shaft, said door driver and said at least one guide shaft pivotally support said spool and said light-shielding door opening and closing hole of said film cartridge, said cartridge shell is able to float at least while said continuous photographic film is being transported therein, said positioning mechanism positions said cartridge shell at the predetermined position in said cartridge loading chamber when the information is read from and written to said IC memory unit.

11. A method of using a film cartridge, comprising the steps of:

bringing at least one contact member of a contact mechanism provided in a cartridge loading chamber into contact with at least one terminal of an IC memory unit provided with a cartridge shell containing a continuous photographic film, after said film cartridge is loaded in said cartridge loading chamber and a chamber door of said cartridge loading chamber is closed;

reading information from said IC memory unit via said at least one contact member, before pulling out said continuous photographic film from said film cartridge;

retreating said at least one contact member from said at least one terminal to enable said cartridge shell to float, after reading the information from said IC memory unit and before removing said continuous photographic film from said film cartridge;

transporting said continuous photographic film in a state wherein said cartridge shell is allowed to float, and processing said continuous photographic film as required;

replacing said continuous photographic film into said film cartridge after completion of the processing;

bringing said at least one contact member into contact with said at least one terminal under pressure and writing information to said IC memory unit after the continuous photographic film is replaced; and opening said chamber door to allow said film cartridge to be unloaded from said cartridge loading chamber after writing the information to said IC memory unit.

12. The method according to claim 11, wherein said contact mechanism is retreated from and brought into contact with said at least one terminal in association with an opening and closing action of said light-shielding door or a locking and unlocking action of a spool rotatable arranged in said cartridge shell.

13. The method according to claim 11, further comprising the steps of:

stopping said continuous photographic film and bringing said at least one contact member into contact with said at least one terminal under pressure so as to read/write the information from/to said IC memory unit when said continuous photographic film is out of said film cartridge; and retreating said at least one contact member from said at least one terminal after the reading/writing of the information to said IC memory unit, thereby enabling said continuous photographic film to be transported.

14. A photographic film cartridge loading bay capable of accessing data stored on a film cartridge, wherein the film cartridge may be positioned and may not float within said photographic film cartridge loading bay, comprising:

a photographic film cartridge loading bay door provided with at least one guide shaft engaging a light-shielding access door located on the film cartridge; and a contact mechanism including at least one contact member contacting at least one terminal located on a memory unit of the film cartridge, wherein said at least one contact member contacts said at least one terminal when a positioning mechanism positions the film cartridge within said photographic film cartridge loading bay so that the film cartridge does not float.

15. The photographic film cartridge loading bay according to claim 14, wherein said positioning mechanism further includes at least one positioning member engaging at least one positioning opening located on the film cartridge so as to position the film cartridge at a predetermined position in said photographic film cartridge loading bay.

16. The photographic film cartridge loading bay according to claim 15, wherein said positioning opening is a hole or a notch.

17. The photographic film cartridge loading bay according to claim 14, wherein said memory unit comprises an IC memory unit.

18. The photographic film cartridge loading bay according to claim 14, further comprising an information reading/writing device reading or writing data from/to said memory unit.

19. The photographic film cartridge loading bay according to claim 14, further comprising a spool drive shaft and a light-shielding access door driver at an end opposite to said photographic film cartridge loading bay door, wherein said spool drive shaft engages a spool, the spool being rotatably supported within the film cartridge and the spool having a continuous photographic film wound about, and said door driver engaging said light- shielding access door so as to open or close said light-shielding access door.

20. A contact mechanism arranged in a photographic film cartridge loading bay for establishing a data transfer connection between the photographic film cartridge loading bay and a memory unit of a loaded film cartridge, comprising:

a contact unit having at least one film cartridge positioning member, being pivotally supported about a pivot axis and having at least one data transfer contact, located on at least one end of said contact unit, for transferring data, wherein said contact unit pivots towards the loaded film cartridge until the at least one film cartridge positioning member engages at least one positioning hole or at least one positioning notch arranged on a cartridge shell of the loaded film cartridge, thereby establishing the data transfer connection between the photographic film cartridge loading bay and the memory unit of the loaded film cartridge.

21. The contact mechanism according to claim 20, wherein said contact mechanism is arranged inside the photographic film cartridge loading bay at an end opposite to a photographic film cartridge loading bay door attached to the photographic film cartridge loading bay.

22. The contact mechanism according to claim 20, wherein said contact unit is rotatably supported by a contact unit shaft.

23. The contact mechanism according to claim 22, wherein said contact unit swings on said contact unit shaft until said at least one film cartridge positioning member comes into contact with the film cartridge, thereby bringing into contact said at least one contact unit data transfer contact and at least one terminal of the film cartridge.

24. The contact mechanism according to claim 20, wherein said at least one contact unit data transfer contact is elastically retractable into said contact unit.

25. The contact mechanism according to claim 20, wherein the memory unit comprises an IC memory unit.

26. The contact mechanism according to claim 20, wherein said film cartridge positioning member comprises a pin.

* * * * *